(12) United States Patent
Tabler

(10) Patent No.: US 8,800,754 B2
(45) Date of Patent: Aug. 12, 2014

(54) CONVEYOR SYSTEM WITH INTERCHANGEABLE DRIVE TUBE COUPLINGS

(75) Inventor: Charles P. Tabler, Cincinnati, OH (US)

(73) Assignee: OCS Intellitrak, Inc., Cincinnati, OH (US)

(*) Notice: Subject to any disclaimer, the term of this patent is extended or adjusted under 35 U.S.C. 154(b) by 56 days.

(21) Appl. No.: 13/466,636

(22) Filed: May 8, 2012

(65) Prior Publication Data

US 2012/0217137 A1 Aug. 30, 2012

Related U.S. Application Data

(63) Continuation-in-part of application No. 12/885,909, filed on Sep. 20, 2010.

(60) Provisional application No. 61/244,662, filed on Sep. 22, 2009.

(51) Int. Cl.
| | |
|---|---|
| *B65G 13/02* | (2006.01) |
| *B65G 35/06* | (2006.01) |
| *F16D 1/104* | (2006.01) |
| *B61B 13/12* | (2006.01) |
| *B65G 13/10* | (2006.01) |
| *F16D 1/10* | (2006.01) |

(52) U.S. Cl.
CPC ............ *B65G 35/063* (2013.01); *B61B 13/125* (2013.01); *B65G 13/10* (2013.01); *F16D 1/104* (2013.01); *F16D 2001/102* (2013.01)
USPC ............................ 198/786; 104/166; 403/298

(58) Field of Classification Search
CPC .................................................. B65G 35/063
USPC .......... 104/166, 167; 198/666, 667, 672, 786; 464/182, 183; 403/298
See application file for complete search history.

(56) References Cited

U.S. PATENT DOCUMENTS

| | | | |
|---|---|---|---|
| 1,761,591 A | * | 6/1930 | Ryder ........................... 198/666 |
| 2,147,878 A | * | 2/1939 | Burmeister .................... 403/26 |
| 2,620,917 A | * | 12/1952 | Dahlberg ...................... 198/659 |
| 2,973,721 A | | 3/1961 | Wagter |
| 3,000,656 A | | 9/1961 | Hollaender |
| 3,164,104 A | | 1/1965 | Hunt |
| 3,195,473 A | | 7/1965 | Dehne |

(Continued)

OTHER PUBLICATIONS

US Office Action dated Mar. 15, 2013 for U.S. Appl. No. 12/885,909.

(Continued)

*Primary Examiner* — William R Harp
(74) *Attorney, Agent, or Firm* — Frost Brown Todd LLC

(57) ABSTRACT

A conveyor system is provided that comprises at least two types of drive tube couplings that are interchangeable. In one embodiment, the conveyor system comprises a plurality of first drive tube couplings and a plurality of second drive tube couplings. The first drive tube couplings comprise a base portion and an elongated portion that extends from the face of the base portion. The second drive tube couplings comprise a coupling spacer and a coupler comprising an elongated member that abuts the face of the coupling spacer and extends substantially perpendicular thereto. In this embodiment the thickness of the base portion of each of the first drive tube couplings is substantially equal to the thickness of the coupling spacer of each of the second drive tube couplings.

20 Claims, 21 Drawing Sheets

(56) References Cited

U.S. PATENT DOCUMENTS

| | | | |
|---|---|---|---|
| 3,360,285 A * | 12/1967 | Huckshold | 403/292 |
| 3,445,139 A * | 5/1969 | von Hippel | 299/43 |
| 3,630,341 A * | 12/1971 | Golden | 198/667 |
| 3,647,094 A * | 3/1972 | Jackson | 414/312 |
| 3,850,280 A | 11/1974 | Ohrnell | |
| 4,203,511 A | 5/1980 | Uhing | |
| 4,375,193 A | 3/1983 | Sullivan | |
| 4,691,818 A * | 9/1987 | Weber | 198/666 |
| 4,843,971 A | 7/1989 | Braunagel | |
| D302,520 S | 8/1989 | Werner | |
| 5,004,095 A * | 4/1991 | Lapeyre et al. | 198/660 |
| 5,127,762 A | 7/1992 | Havlovitz | |
| 5,144,780 A | 9/1992 | Gieling et al. | |
| 5,186,308 A | 2/1993 | Munro | |
| 5,400,717 A | 3/1995 | Hoehn | |
| 5,454,661 A | 10/1995 | Litvin et al. | |
| 5,685,382 A * | 11/1997 | Deeter | 175/394 |
| 5,785,168 A | 7/1998 | Beall, Jr. | |
| 5,806,655 A | 9/1998 | Tabler | |
| 5,899,319 A * | 5/1999 | Jarnagin | 198/666 |
| 5,957,057 A | 9/1999 | Nakamura et al. | |
| 5,967,693 A * | 10/1999 | Braaten et al. | 403/383 |
| 6,032,785 A * | 3/2000 | Beall, Jr. | 198/465.4 |
| 6,267,060 B1 * | 7/2001 | Owens, Jr. | 104/166 |
| 6,422,376 B1 * | 7/2002 | Nichols et al. | 198/668 |
| 6,457,418 B1 | 10/2002 | Persson | |
| 6,857,247 B2 | 2/2005 | Adams | |
| 6,953,300 B2 | 10/2005 | Chen | |
| 7,018,299 B2 | 3/2006 | da Silva | |
| 7,186,050 B2 | 3/2007 | Dean et al. | |
| 7,421,953 B2 | 9/2008 | Johansson et al. | |
| 7,562,763 B2 * | 7/2009 | Tabler | 198/465.4 |
| 7,686,156 B2 * | 3/2010 | Tabler | 198/465.4 |
| 7,946,924 B2 | 5/2011 | Neugebauer et al. | |
| 2005/0183620 A1 | 8/2005 | Kawato et al. | |
| 2007/0178975 A1 | 8/2007 | Neugebauer et al. | |
| 2009/0078535 A1 * | 3/2009 | Tabler | 198/465.3 |
| 2009/0279992 A1 | 11/2009 | Spangler et al. | |
| 2011/0070020 A1 | 3/2011 | Tabler | |

OTHER PUBLICATIONS

US Office Action, Final Rejection, dated Aug. 20, 2013 for U.S. Appl. No. 12/855,909.

* cited by examiner

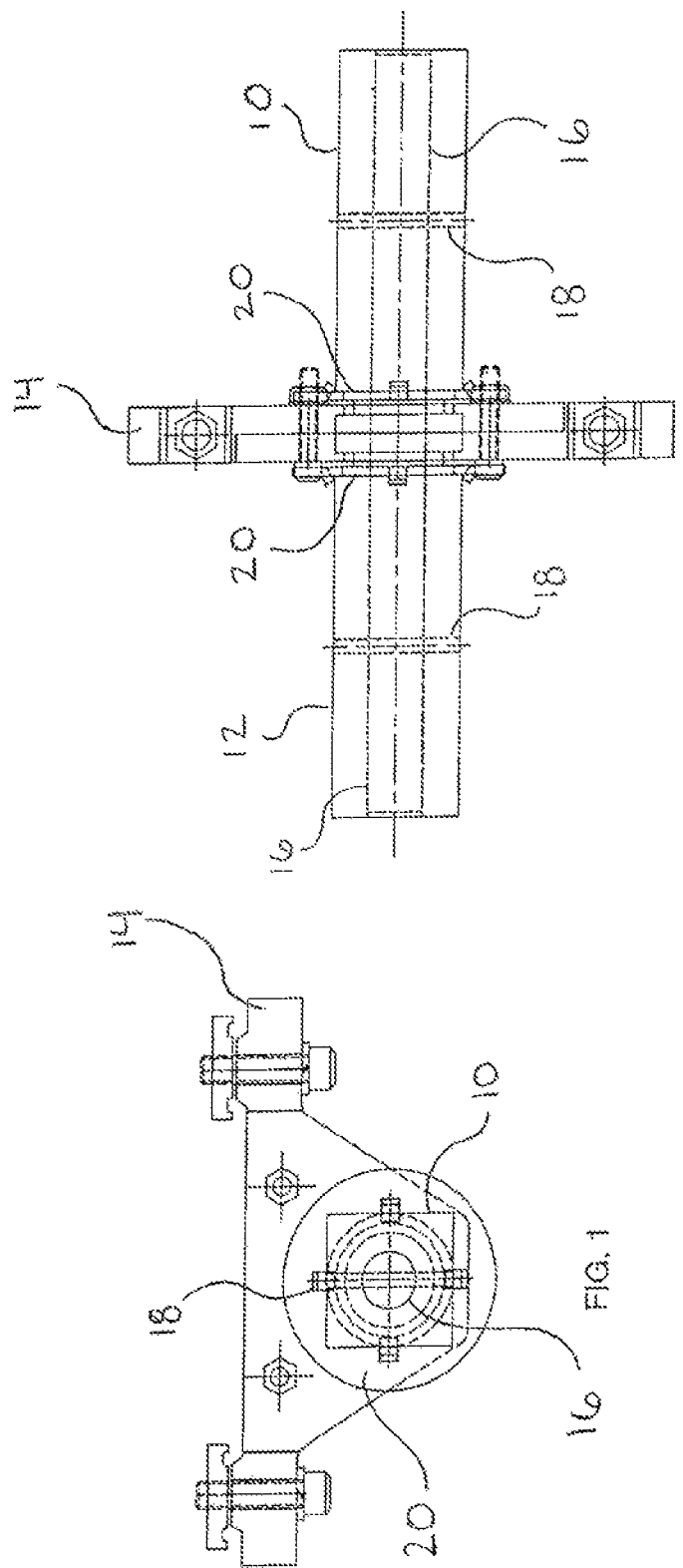

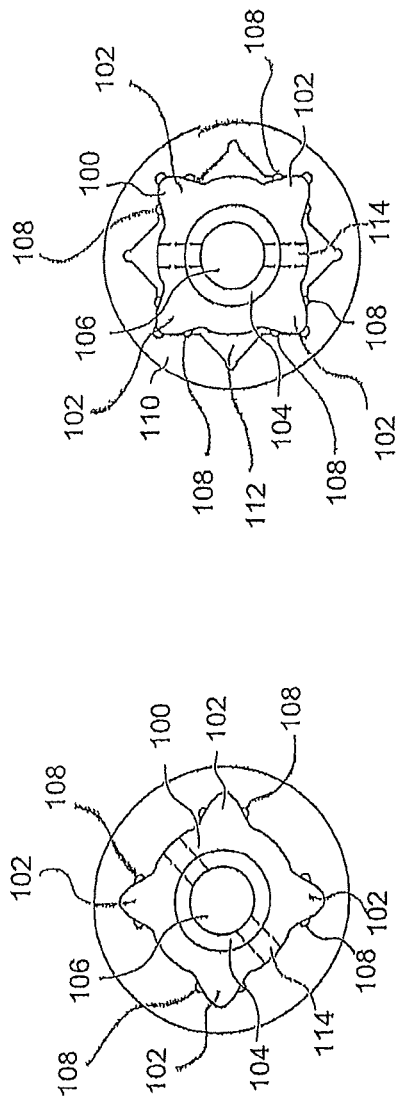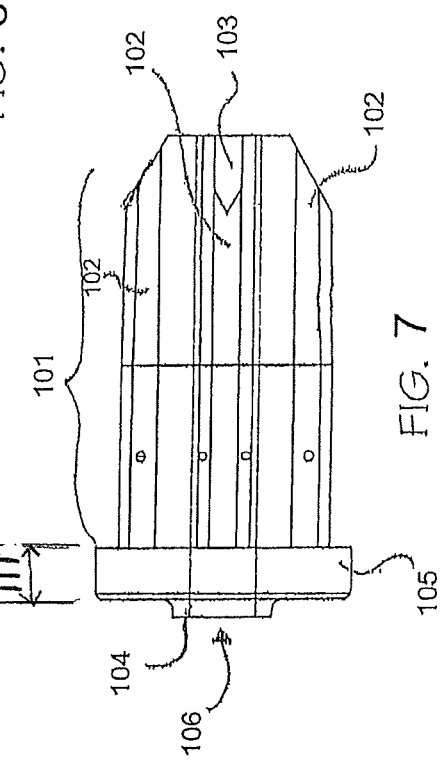

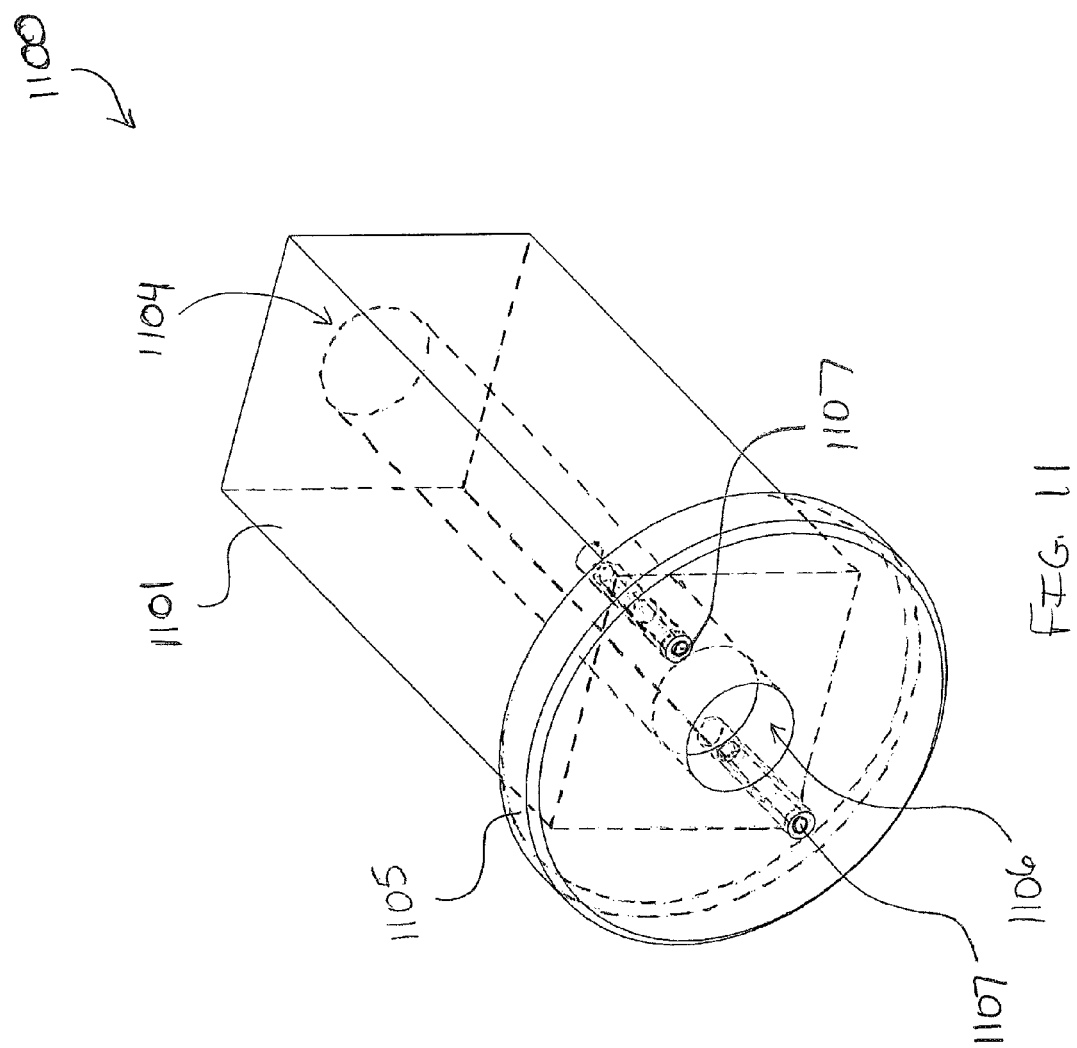

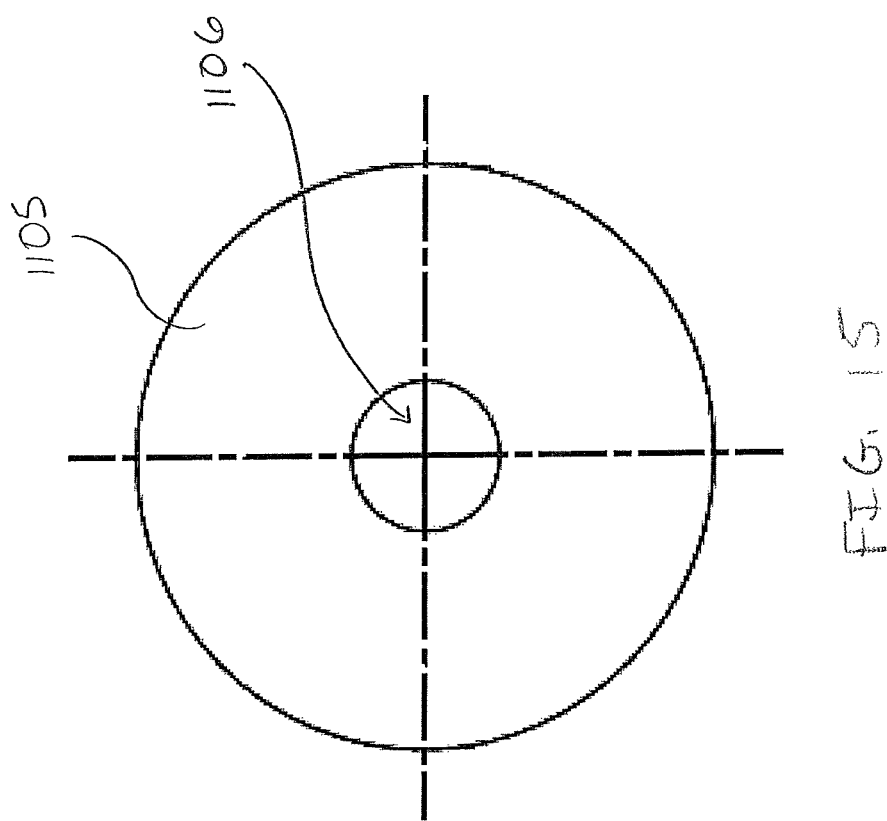

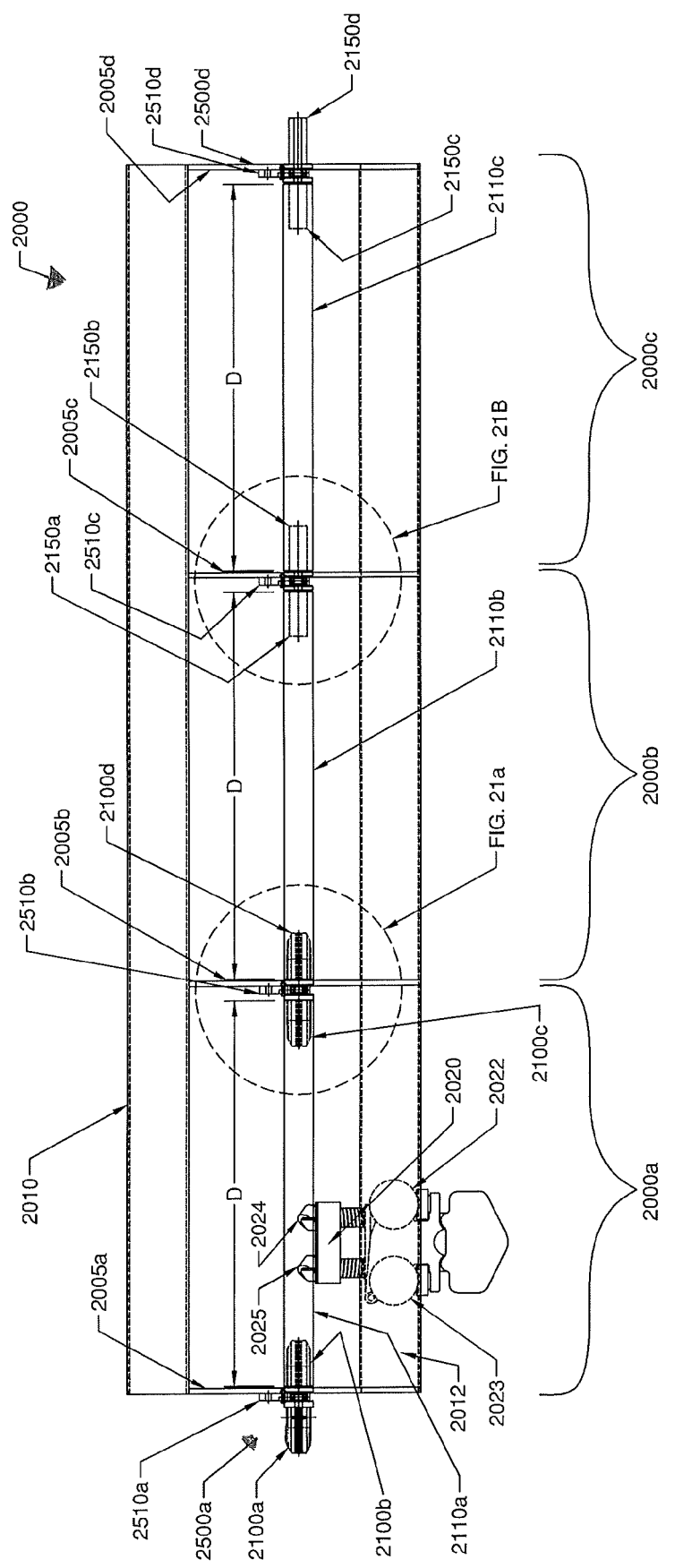

CONVEYOR SYSTEM WITH INTERCHANGEABLE DRIVE TUBE COUPLINGS

PRIORITY

This application is a continuation in part of U.S. Non-Provisional patent application Ser. No. 12/885,909, filed on Sep. 20, 2010, titled "Heavy-Duty Drive Tube Coupling," the disclosure of which is incorporated herein by reference, which claims priority to U.S. Provisional Patent Application Ser. No. 61/244,662, filed Sep. 22, 2009, titled "Heavy-Duty Drive Tube Coupling," the disclosure of which is incorporated by reference herein.

BACKGROUND

In a factory or distribution warehouse, it may be desirable to move loads along a transporting path that is predominately horizontal, but which may also involve travel uphill, downhill, diversion between subpaths, and the like. Overhead conveyor systems allow such movement. The systems may comprise rotating drive tubes, a carriage that is supported by the drive tube or a fixed support rail and that has skewed drive wheels to engage with the rotating drive tube. The engagement of the skewed wheels with the rotating drive tube propels the carriage along the rotating drive tube or along a fixed rail.

In some conveyor systems, many drive tubes may be used. When multiple drive tubes are used, it may be necessary to connect several drive tubes in succession. Typical devices and methods of connecting drive tubes, such as couplings, may be costly and cumbersome as they may require numerous parts. In addition, different sections of a single conveyor system may be subject to different environmental conditions, which may result in a single conveyor system requiring different types of couplings for different sections. By way of example only, in some embodiments, a single conveyor system may require one or more couplings capable of being subjected to elevated temperatures for one section of the conveyor system, while couplings used in another section of the conveyor system do not need to be capable of being subjected to elevated temperatures. As a result, in these types of conveyor systems, the length of the drive tubes may vary depending on which types of couplings are used to connect a series of adjacent drive tubes. Requiring more than one length of drive tube may increase the cost and time required for assembly or repair. Therefore, it may be beneficial to provide a conveyor system incorporating multiple types of couplings wherein a standard length of drive tube can be used irrespective of what types of couplings are used to connect adjacent drive tubes.

While a variety of conveyor systems and coupling devices have been made and used, it is believed that no one prior to the inventor has made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

FIG. 1 is a front view of a prior art drive tube coupling assembly.

FIG. 2 is a top view of the prior art drive tube coupling assembly of FIG. 1.

FIG. 6 is a front view of the integral drive tube coupling of FIG. 5.

FIG. 8 is a front view of the integral drive tube coupling of FIG. 5 within an exemplary drive tube.

FIG. 11 is a perspective view of an exemplary assembled drive tube coupling.

FIG. 15 is a front view of an exemplary coupling spacer of the assembled drive tube coupling of FIG. 11 (without the roll pin holes 1108, 1109).

FIG. 17 is a front view of an exemplary coupler of the assembled drive tube coupling of FIG. 11 (without the roll pin holes 1108, 1109).

FIG. 21 is a side view of an exemplary conveyor system that includes a series of drive tubes engaged with a combination of the integral drive tube coupling of FIG. 5 and the assembled drive tube coupling of FIG. 11.

Figure 4:
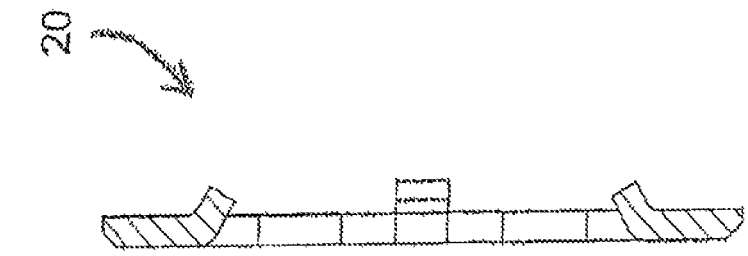
FIG. 4 is a cross-sectional view of the prior art washer of FIG. 3 taken along line 4-4.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples should not be used to limit the scope of the present invention. Other features, aspects, and advantages of the embodiments disclosed herein will become apparent to those skilled in the art from the following description, which is by way of illustration, one of the best modes contemplated for carrying out the invention. As will be realized, the embodiments described herein are capable of other different and obvious aspects, all without departing from the invention. Accordingly, the drawings and descriptions should be regarded as illustrative in nature and not restrictive.

Embodiments of the present drive tube coupling may be used in heavy duty conveyor systems, particularly overhead conveyor systems comprising a carriage suspended therefrom and a rotating drive tube configured to drive the carriage along the overhead conveyor system. Of course, other suitable uses for various embodiments will be apparent to those of ordinary skill in the art based on the teachings herein. By way of example only, embodiments of the present drive tube coupling may be used in overhead conveyors of the type disclosed in U.S. Pat. No. 5,806,655 issued Sep. 15, 1998 to Tabler; U.S. Pat. No. 5,785,168 issued Jul. 28, 1998 to Beall, Jr.; U.S. Pat. No. 4,203,511 issued May 20, 1980 to Uhing; U.S. Pat. No. 3,164,104 issued Jan. 5, 1965 to Hunt; and U.S. Pat. No. 3,850,280 issued Nov. 26, 1974 to Ohrnell. The disclosures of each of these patents are incorporated by reference herein.

Figure 3:
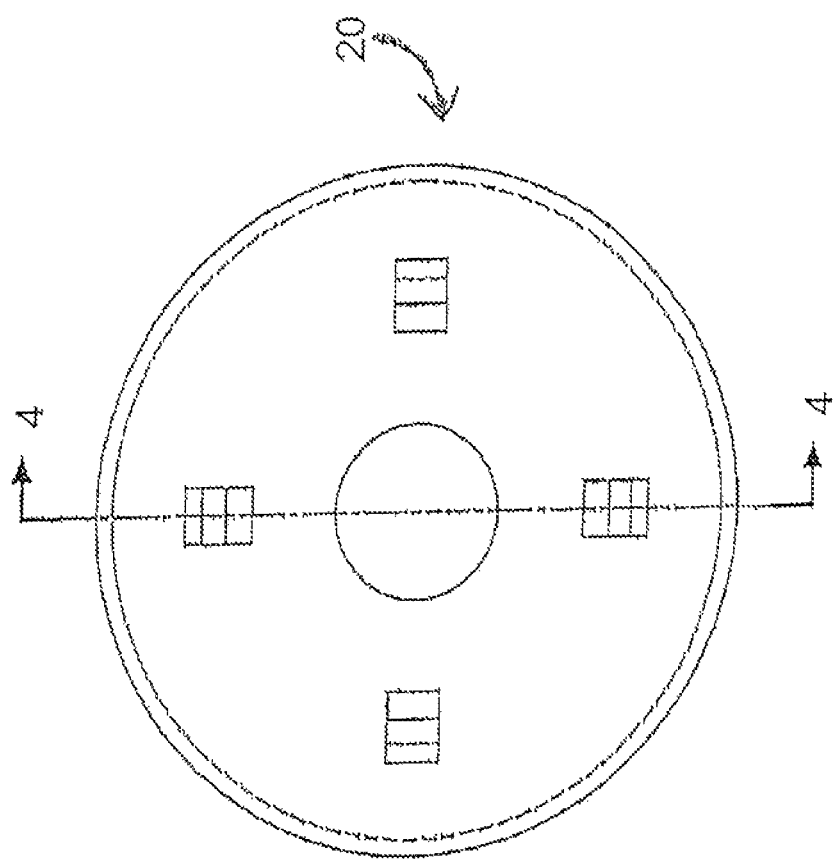
FIG. 3 is a front view of a prior art washer.
Figure 5:
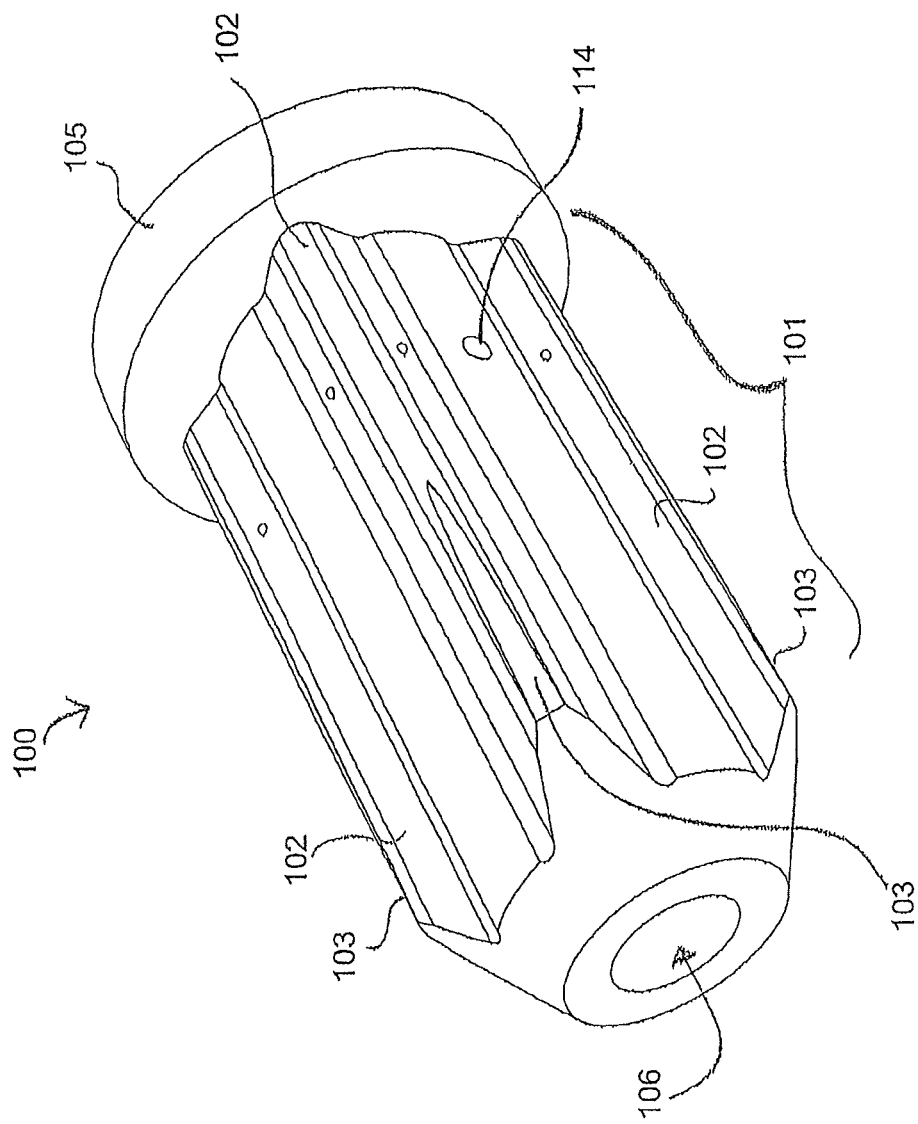
FIG. 5 is a perspective view of an exemplary integral drive tube coupling.

FIGS. 1 and 2 show an example of prior art drive tube couplings (10, 12), which comprise a substantially square bar configured to engage a drive tube. In some embodiments, prior art drive tube couplings (10, 12) may be made out of aluminum. Specifically, FIG. 2 shows an assembly comprising two prior art drive tube couplings (10, 12) connected to opposite sides of a bearing unit (14) using a prior art washer (20) on each side of bearing unit (14). FIGS. 3 and 4 show washer (20), which may be required to attach prior art drive tube couplings (10, 12) to bearing unit (14). As shown, bearing unit (14) includes a rotatable shaft (16) that is inserted through a central opening in bearing unit (14). In the illustrated embodiment, drive tube couplings (10, 12) are mounted onto shaft (16) on either side of bearing unit (14). At least one roll pin (18) is inserted through each drive tube coupling (10, 12) and shaft (16) to engage each drive tube coupling (10, 12) to shaft (16) such that drive tube couplings (10, 12) rotate unitarily with shaft (16).

Figure 7:
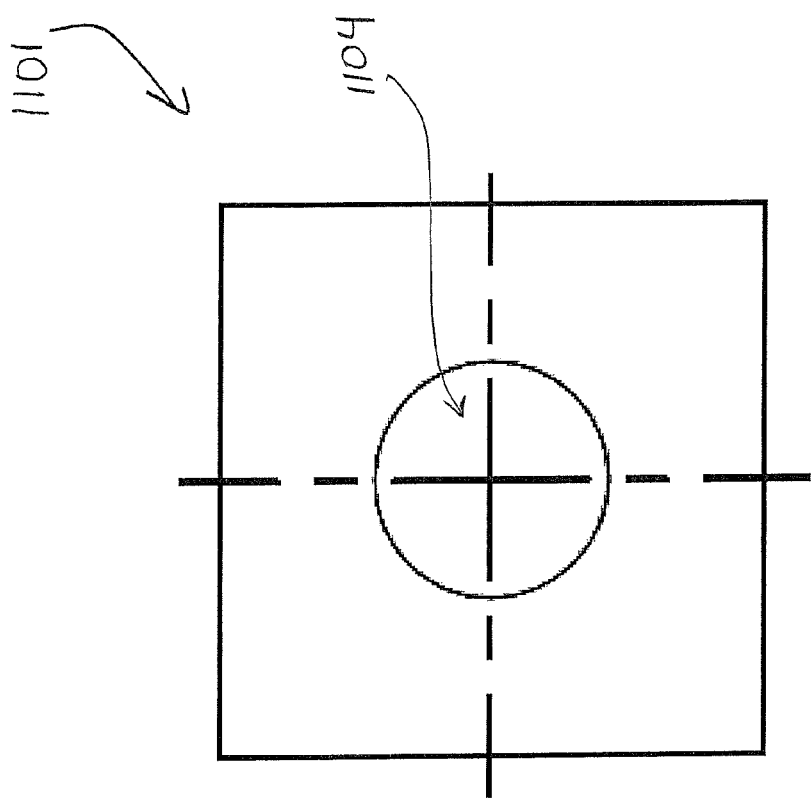
FIG. 7 is a side view of the integral drive tube coupling of FIG. 5.
Figure 18:
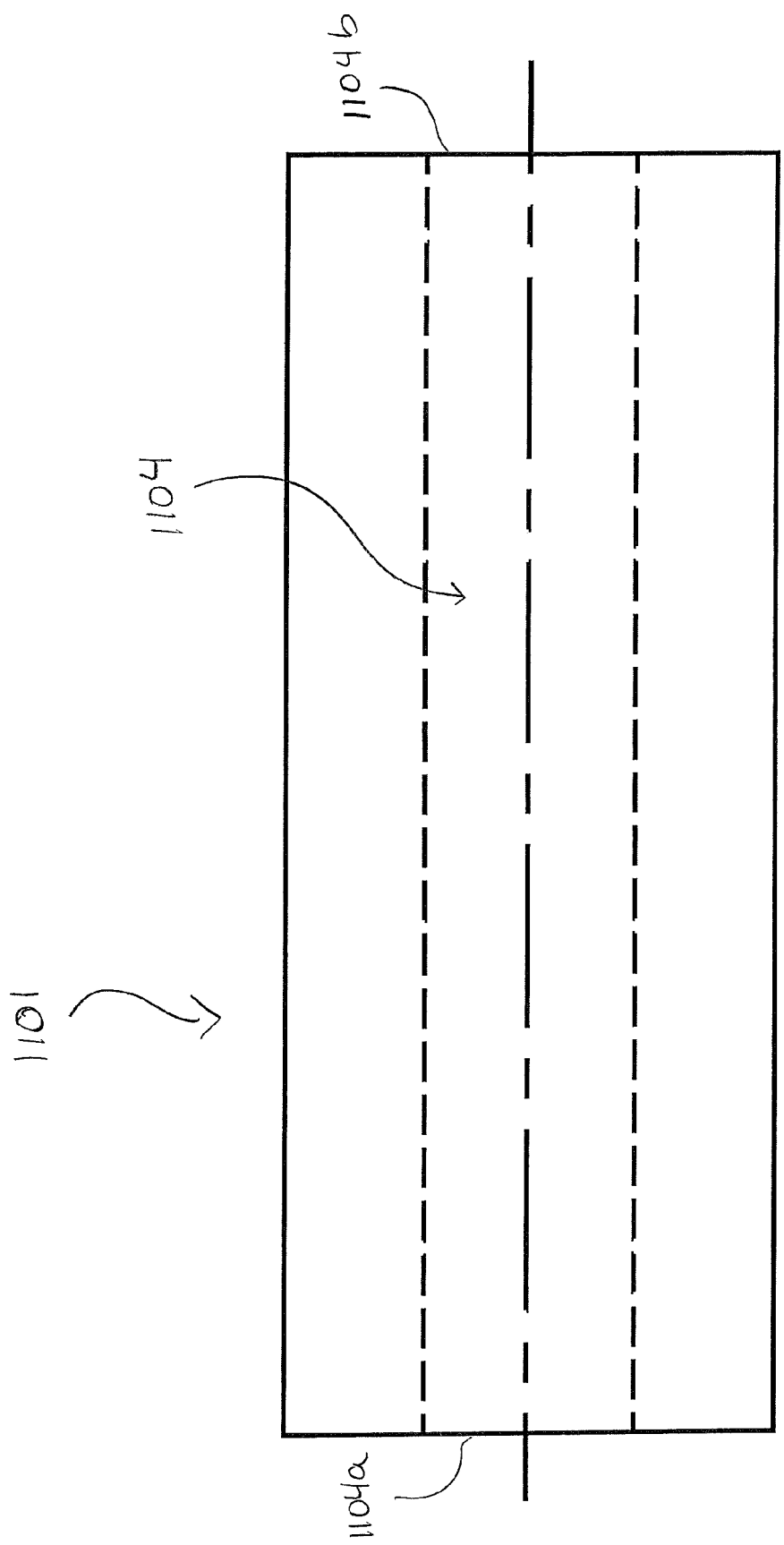
FIG. 18 is a side view of the coupler of FIG. 17.

FIGS. 5-8 depict an exemplary integral drive tube coupling (100) comprising an elongated portion (101) extending from a base portion (105). As used herein, the phrase "integral drive tube coupling" refers to a drive tube coupling wherein the elongated portion and the base portion are integrally connected with each other. In this embodiment, elongated portion (101) extends substantially perpendicular to an inner surface of base portion (105), but this is not required. In the illustrated embodiment, base portion (105) comprises a substantially circular cross section. Of course, other suitable cross-sections for base portion may be used. As shown, elongated portion (101) of integral drive tube coupling (100) comprises a substantially square cross section with scalloped sides. In the illustrated embodiment, base portion (105) of integral drive tube coupling (100) is configured to replace the use of a washer, such as washer (20), that was required in prior art assemblies. As shown in FIG. 7, base portion (105) comprises a thickness (111). The thickness (111) may be any dimension suitable to result in a gap between the end of a drive tube and the inner face of the adjacent base portion or coupling spacer (depending on the type of drive tube coupling) is small enough to allow the canted wheels of the trolley to freely transition between adjacent drive tubes without either causing damage to the canted wheels or causing the trolley to get hung up while transitioning between drive tubes. In some embodiments, the thickness (111) of base portion (105) may be in the range from about 0.125" to about 0.75", and preferably the thickness (111) may be about 0.5". The thickness (111) may vary based on one or more factors, including but not limited to the ambient temperature where the coupling is being used, the interval between conveyor hangers for that section of conveyor, the length of the drive tube for that section of conveyor, and the width of the canted wheels on the trolley traveling on that section of conveyor. In some embodiments, thickness (111) of base portion may be greater than the thickness of washer (20) in the coupling assemblies described above and shown in FIGS. 1-2. In particular, embodiments of integral drive tube coupling (100) may be assembled together without washers, which may reduce labor and tooling costs. In this embodiment, elongated portion (101) comprises four ribs (102) equally spaced around the perimeter of elongated portion (101) and positioned on each corner of elongated portion (101). As shown, each rib (102) comprises a curved profile comprising angled or rounded sides along substantially the entire length of each rib (102) and a tapered portion (103) adjacent to the free end of each rib (102) (i.e. the end of each rib (102) distal to the end attached to base portion (105)). Of course, other suitable configurations for elongated portion (101) that provide an adequate engagement between the integral drive tube coupling (100) and a corresponding drive tube may be used. Other suitable configurations may include changes to the shape, number, and arrangement of ribs (102), tapered portions (103) and/or the general cross-section of elongated portion (101).

Elongated portion (101), and more specifically ribs (102), may be configured to correspond with and provide a friction fit between integral drive tube coupling (100) and a corresponding drive tube (110). An exemplary drive tube is shown in FIG. 8 (with integral drive tube coupling (100) inserted into drive tube (110)) and FIG. 9 (without integral drive tube coupling (100)). The relationship or fit between integral drive tube coupling (100) and drive tube (110) may help prevent integral drive tube coupling (100) from disengaging from drive tube (110) during the assembly process, which is described below.

In the illustrated embodiment, each rib (102) further comprises a detent (108) positioned on each side of the rib (102). As shown, each detent (108) comprises a semicircular protuberance extending from the surface of each rib (102). The number, size, placement, and shape of detents (108) may vary, provided the detents (108) are configured to enhance the friction fit between integral drive tube coupling (100) and drive tube (110). For example in alternate embodiments, fewer than all of the ribs may have detents or each rib may only have a single detent positioned on one side of the respective rib. In still further embodiments, each rib may comprise more than one detent on each side of one or more ribs. As shown, each detent (108) comprises a substantially similar shape, size, and location on the respective ribs (102), however this is not required. In the illustrated embodiment, detents (108) are arranged co-linearly around the perimeter of elongated portion (101), however this is not required. Detents (108) may be configured to add further friction between the two components when integral drive tube coupling (100) is inserted into drive tube (110). In still other alternate embodiments, the detents may be omitted entirely.

In this embodiment, integral drive tube coupling (100) further comprises an inner tube (104) that extends lengthwise through the center of integral drive tube coupling (100). Inner tube (104) may extend along the entire length of elongated portion (101) and through base portion (105). As shown, inner tube (104) is substantially cylindrical in shape and defines a central opening (106) extending through the center of integral drive tube coupling (100). In the illustrated embodiment, integral drive tube coupling (100) further comprises a roll pin hole (114) that extends substantially transverse to inner tube (104). Roll pin hole (114) is configured to receive a roll pin (not shown) when integral drive tube coupling (100) is assembled together with a bearing unit, such as bearing unit (510) described below.

FIG. 8 depicts integral drive tube coupling (100) positioned within a drive tube (110). Drive tube (110) is shown without integral drive tube coupling (100) in FIG. 9. As shown, drive tube (110) comprises an interior cavity (112) defined by an interior wall (113). In the illustrated embodiment, cavity (112) comprises a regular, sixteen-sided, generally star-shaped cross section. However, drive tube (110) may comprise any suitable shaped cross section as would be apparent to one of ordinary skill in the art in view of the teachings herein. Cavity (112) may be configured to receive elongated portion (101) of integral drive tube coupling (100). In this embodiment, each corner of cavity (112) defined by interior wall (113) is configured to receive and abut at least a portion of a respective rib (102). As shown, the generally star-shaped cross section of cavity (112) is advantageously configured to provide increased flexibility during assembly by allowing elongated portion (101) and drive tube (110) to be assembled together with the components at several different angles or orientations relative to each other. In particular, the cross section of cavity (112) is configured to allow elongated portion (101) and drive tube (110) to be assembled together when the components are in a first orientation or a second orientation. The second orientation occurs when one of the components is rotated about 45 degrees relative to its position in the first orientation. In addition, cavity (112) may be configured to correspond to the profile of elongated portion (101) such that ribs (102) and/or detents (108) result in an adequate friction fit between drive tube (110) and integral drive tube coupling (100). As a result of the engagement between drive tube (110) and integral drive tube coupling (100), the two components may be configured to rotate in unison with each other.

Embodiments of integral drive tube coupling (100) may be used to help assemble a series of drive tubes (110) during assembly of an overall conveyor system. For example, a first integral drive tube coupling (100) may be inserted into a first drive tube (110) and that complete assembly may then be attached to a preceding drive tube (110) that is already located in the conveyor system. The friction fit provided by ribs (102) and/or detents (108) may facilitate assembly by helping to ensure that the first integral drive tube coupling (100) remains engaged with and inside the first drive tube (110) during this assembly operation.

Figure 10:
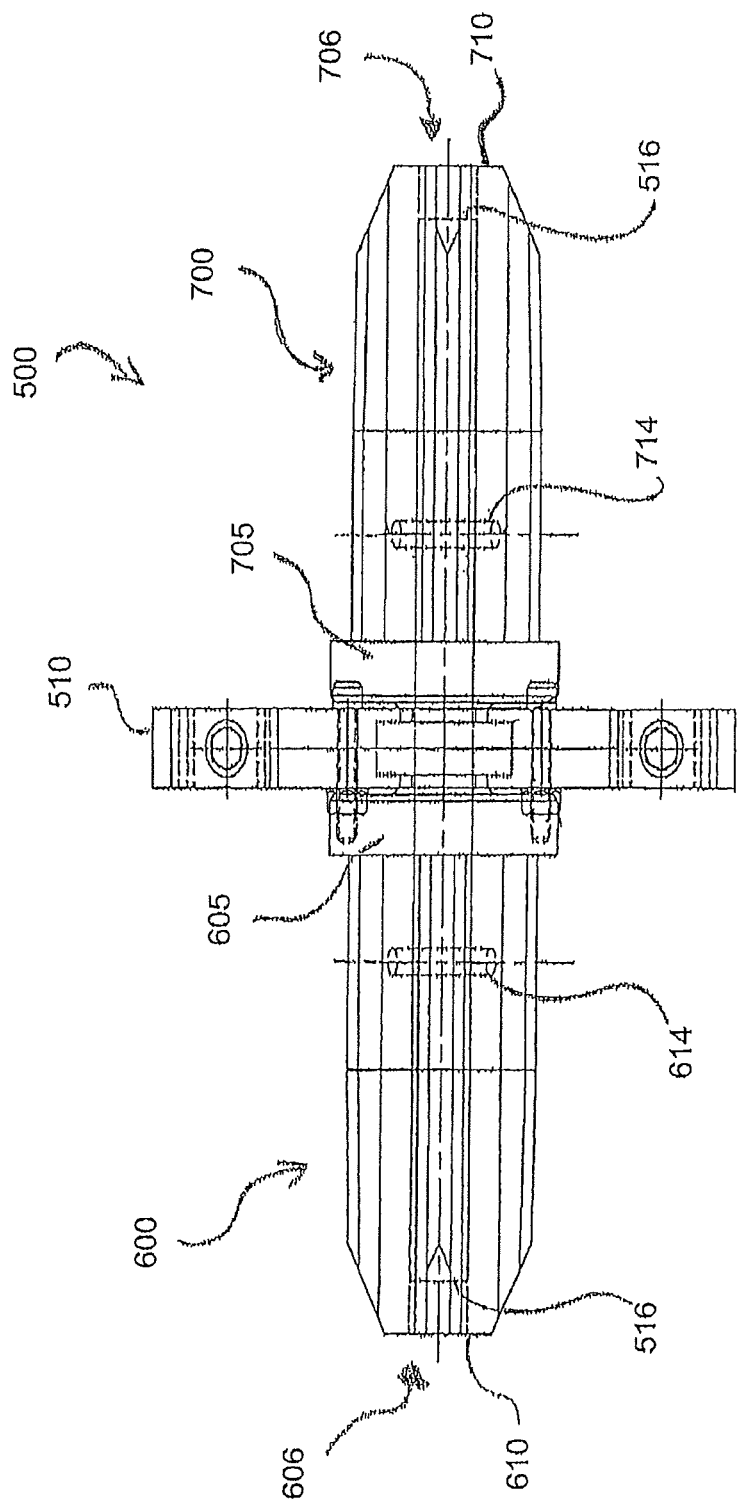
FIG. 10 is a top view of an exemplary drive tube coupling assembly including two of the integral drive tube coupling of FIG. 5.

FIG. 10 depicts a drive tube coupling assembly (500) comprising a pair of integral drive tube couplings (600, 700) attached to a bearing unit (510). As shown, integral drive tube couplings (600, 700) are substantially identical to coupling (100) described above. Similar to bearing unit (14) described above, bearing unit (510) includes a rotatable shaft (516) inserted through a central opening in bearing unit (510). In the illustrated embodiment, integral drive tube couplings (600, 700) are mounted to shaft (516) on either side of bearing unit (510) by inserting shaft (516) through the central opening (606, 706) in each coupling (600, 700). In this embodiment, couplings (600, 700) are positioned along shaft such that base portions (605, 705) are substantially adjacent to bearing unit (510). Shaft (516) may be sized such that it provides a friction fit when inserted into the central opening (606, 706) of each coupling (600, 700), but this is not necessarily required. Each integral drive tube coupling (600, 700) may be engaged with shaft (516) by inserting at least one roll pin through a roll pin hole (614, 714) in each coupling (600, 700) and a corresponding opening in shaft (516). The roll pin may be configured to engage each coupling (600, 700) with shaft (516) such that integral drive tube couplings (600, 700) rotate unitarily with shaft (516), and, consequently, rotate unitarily with each other. In some embodiments the roll pin may be omitted from at least one coupling and any other suitable method or device for engaging at least one coupling with the shaft may be used, including but not limited to use of an adhesive, surface treatment or dimensioning the components to provide an adequate friction fit between each coupling and the shaft.

Drive tube coupling assembly (500) may be used to attach two drive tubes (not shown) together to form at least a portion of a conveyor system. As shown, the base portion (605, 705) of each coupling (600, 700) is adjacent to bearing unit (510). Contrary to the prior art coupling assembly shown in FIGS. 1 and 2, coupling assembly (500) does not require a washer (such as washer (20)) to attach couplings (600, 700) to bearing unit (510). Instead, the base portion (605, 705) of each coupling (600, 700) serves the same function as washer (20) in the prior art assembly. In the illustrated embodiment, each coupling (600, 700) extends substantially perpendicularly from opposite sides of bearing unit (510). A drive tube (not shown) may then be inserted onto the free end (610, 710) of each coupling (600, 700) to form a part of a conveyor system. Coupling assembly (500) may be assembled such that couplings (600, 700) can freely rotate relative to bearing unit (510). As a result, coupling (600) and a drive tube engaged therewith will rotate in unison with each other. Similarly, coupling (700) and a drive tube engaged therewith will rotate in unison with each other. Couplings (600, 700) may be configured to rotate in unison together.

In one embodiment, integral drive tube coupling (100) is molded from a high density urethane elastomer. Of course, drive tube coupling may comprise any suitable material configured to provide desired durability and strength depending on the particular application of coupling (100), including but not limited to other materials and resins suitable for use in casting or injection molding processes. Integral drive tube coupling (100) may be molded as one piece in its finished shape, which may eliminate the need to machine the finished part. Molded embodiments of the integral drive tube coupling may have the cross sectional shape shown in FIG. 1 (i.e. substantially square), or the cross-sectional shape shown in FIGS. 5-8. Additionally, embodiments of integral drive tube coupling (100) comprising a molded elastomer may help reduce and/or eliminate noise caused by contact between drive tube coupling (100) and drive tube (110) when the conveyor system is in operation. In prior art embodiments, wherein both the drive tube coupling (10) and the drive tube comprise metal or some other similar material, contact between the drive tube coupling (10) and the drive tube produced noise during operation of the conveyor.

FIGS. 11-20 depict an alternate exemplary assembled drive tube coupling (1100) and the components thereof. As used herein, the phrase "assembled drive tube coupling" refers to a drive tube coupling wherein the elongated portion and the coupling spacer are separate components that are mechanically connected to each other. Similar to prior art drive tube couplings (10, 12) shown in FIGS. 1-2 and described above, assembled drive tube coupling (1100) may be made out of a metal, such as aluminum, steel, or bronze, high temperature rubber, or any other suitable material configured to provide desired durability and strength depending on the particular application of coupling (1100), including but not limited to other materials configured to allow coupling (1100) to be used in a high temperature environment. In some embodiments, assembled drive tube coupling (1100) may comprise material capable of withstanding the same temperatures as the drive tube being used in that section of conveyor. In some embodiments the coupling spacer (1105) and elongated coupler (1101) may comprise the same material, while in other embodiments the coupling spacer (1105) and elongated coupler (1101) may comprise different materials. In some embodiments, the material for assembled drive tube coupling (1100) may be selected to allow assembled drive tube coupling (1100) to withstand elevated temperatures so that assembled drive tube coupling (1100) can be used in environments where the conveyor system and, correspondingly, assembled drive tube coupling (1100) are subjected to elevated temperatures. As used herein "high temperature" or "elevated temperatures" generally refers to ambient temperatures for a particular conveyor section at which other components of the conveyor section begin to fail. So, it depends on the types of materials used for components in that particular conveyor system. For example in embodiments that include an integral drive tube coupling, such as integral drive tube coupling (100), "elevated temperatures" refers to temperatures that would cause the integral drive tube coupling (100) to fail. The specific temperature depends on the particular material used to make the integral coupling. By way of example only, if the integral coupling (100) comprises a standard high density urethane elastomer, then "elevated temperatures" may refer to temperatures above about 180 degrees Fahrenheit.

As shown, assembled drive tube coupling (1100) comprises a coupling spacer (1105) and an elongated portion or coupler (1101). In the illustrated embodiment shown in FIGS. 11-16, coupling spacer (1105) comprises a substantially circular cross-section. Of course, other suitable cross-sections for coupling spacer (1105) may be used. In this embodiment, coupling spacer (1105) comprises a central opening (1106) that extends through coupling spacer (1105) and a pair of roll pin holes (1108) positioned diagonally relative to each other on opposite sides of central opening (1106). As shown, roll pin holes (1108) also extend through coupling spacer (1105). The number of roll pin holes (1108) in coupling spacer (1105) may correspond to the number of roll pin holes (1109) in coupler (1101) and roll pin holes (1108) may be arranged so that they each align with a corresponding roll pin hole (1109) in coupler (1101) when coupling spacer (1105) and coupler (1101) are assembled together to form assembled drive tube coupling (1100). Roll pin holes (1108) may be configured to receive at least a portion of a roll pin (1107) in order to attach coupling spacer (1105) to coupler (1101). Other suitable numbers and arrangements for roll pin holes (1108) may be used, as long as they provide for an adequate engagement between coupling spacer (1105) and coupler (1101). In some embodiments, roll pin holes (1108) may be omitted all together if other suitable devices and methods for attaching coupling spacer (1105) and coupler (1101) are used instead of roll pins.

Figure 13:
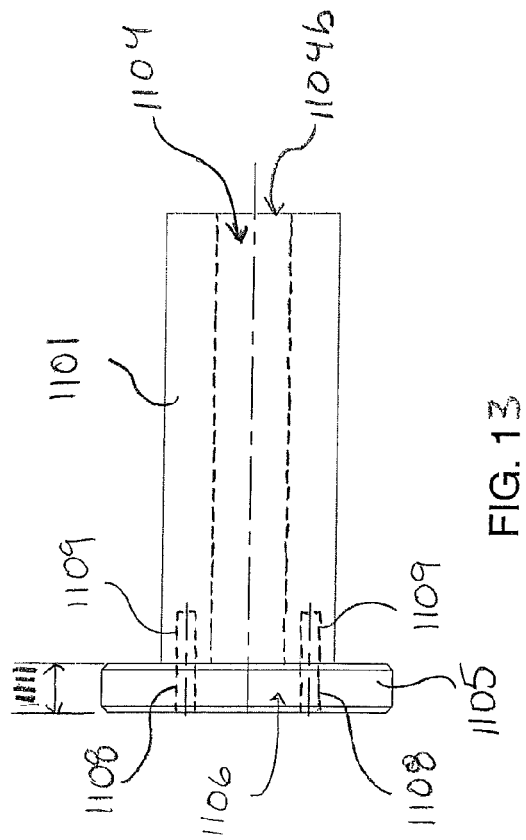
FIG. 13 is a side view of the assembled drive tube coupling of FIG. 11.
Figure 16:
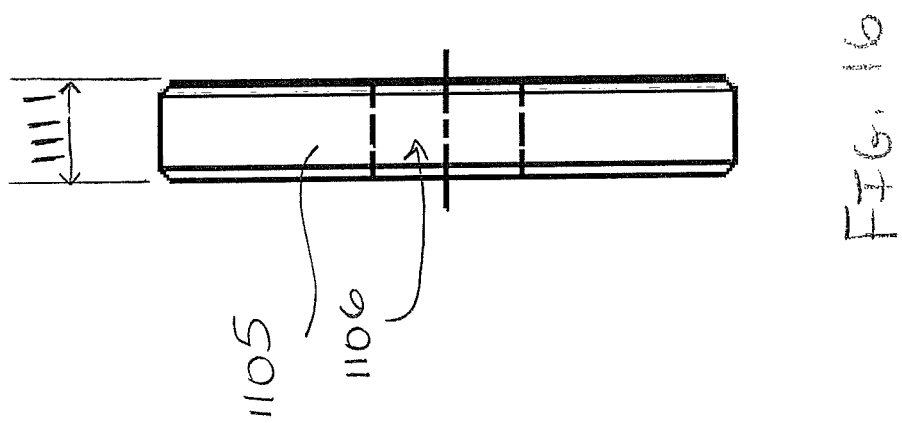
FIG. 16 is a side view of the coupling spacer of FIG. 15.

As shown in FIGS. 13 and 16 coupling spacer (1105) comprises a thickness (1111). The thickness (1111) may be any dimension suitable to result in a gap between the end of a drive tube and the inner face of the adjacent base portion or coupling spacer (depending on the type of drive tube coupling) is small enough to allow the canted wheels of the trolley to freely transition between adjacent drive tubes without either causing damage to the canted wheels or causing the trolley to get hung up while transitioning between drive tubes.

In some embodiments, the thickness (1111) of coupling spacer (1105) may be in the range from about 0.125" to about 0.75", and preferably the thickness (1111) may be about 0.5". The thickness (1111) may vary based on one or more factors, including but not limited to the ambient temperature where the coupling is being used, the interval between conveyor hangers for that section of conveyor, the length of the drive tube for that section of conveyor, and the width of the canted wheels on the trolley traveling on that section of conveyor. In some embodiments, thickness (1111) of coupling spacer (1105) may be greater than the thickness of washer (20) in the coupling assemblies described above and shown in FIGS. 1-2. In addition, in some embodiments, such as the one shown in FIG. 21 and described in more detail below, where a single conveyor system includes two or more types of drive tube couplings, such as integral drive tube coupling (100) and assembled drive tube coupling (1100), thickness (1111) of coupling spacer (1105) used as part of assembled drive tube coupling (1100) may be substantially equal to the thickness (111) of base portion (105) of drive tube coupling (100).

As shown in FIGS. 11-14 and 17-18, coupler (1101) of assembled drive tube coupling (1100) comprises a substantially square cross section. In this embodiment, coupler (1101) extends substantially perpendicular to an inner surface or face of coupling spacer (1105). As shown, coupler (1101) comprises an inner tube (1104) that extends lengthwise through the center of coupler (1101). Inner tube (1104) may extend along the entire length of coupler (1101) and terminates in central openings (1104a, 1104b) on either end of coupler (1101). In the illustrated embodiment, coupler (1101) further comprises a pair of roll pin holes (1109) that are positioned diagonally relative to each other on opposite sides of central opening (1104a). The number of roll pin holes (1109) in coupler (1101) may correspond to the number of roll pin holes (1108) in coupling spacer (1105) and roll pin holes (1109) may be arranged so that they each align with a corresponding roll pin hole (1108) in coupling spacer (1105) when coupling spacer (1105) and coupler (1101) are assembled together to form assembled drive tube coupling (1100). Other suitable numbers and arrangements for roll pin holes (1109) may be used, as long as they provide for an adequate engagement between coupling spacer (1105) and coupler (1101). In some embodiments, roll pin holes (1109) may be omitted all together if other suitable devices and methods for attaching coupling spacer (1105) and coupler (1101) are used instead of roll pins. Roll pin holes (1109) may be configured to receive at least a portion of a roll pin (1107) in order to attach coupling spacer (1105) to coupler (1101). As shown, roll pin holes (1109) extend along a portion of the length of coupler (1101), but do not extend along the entire length of coupler (1101).

Figure 20:
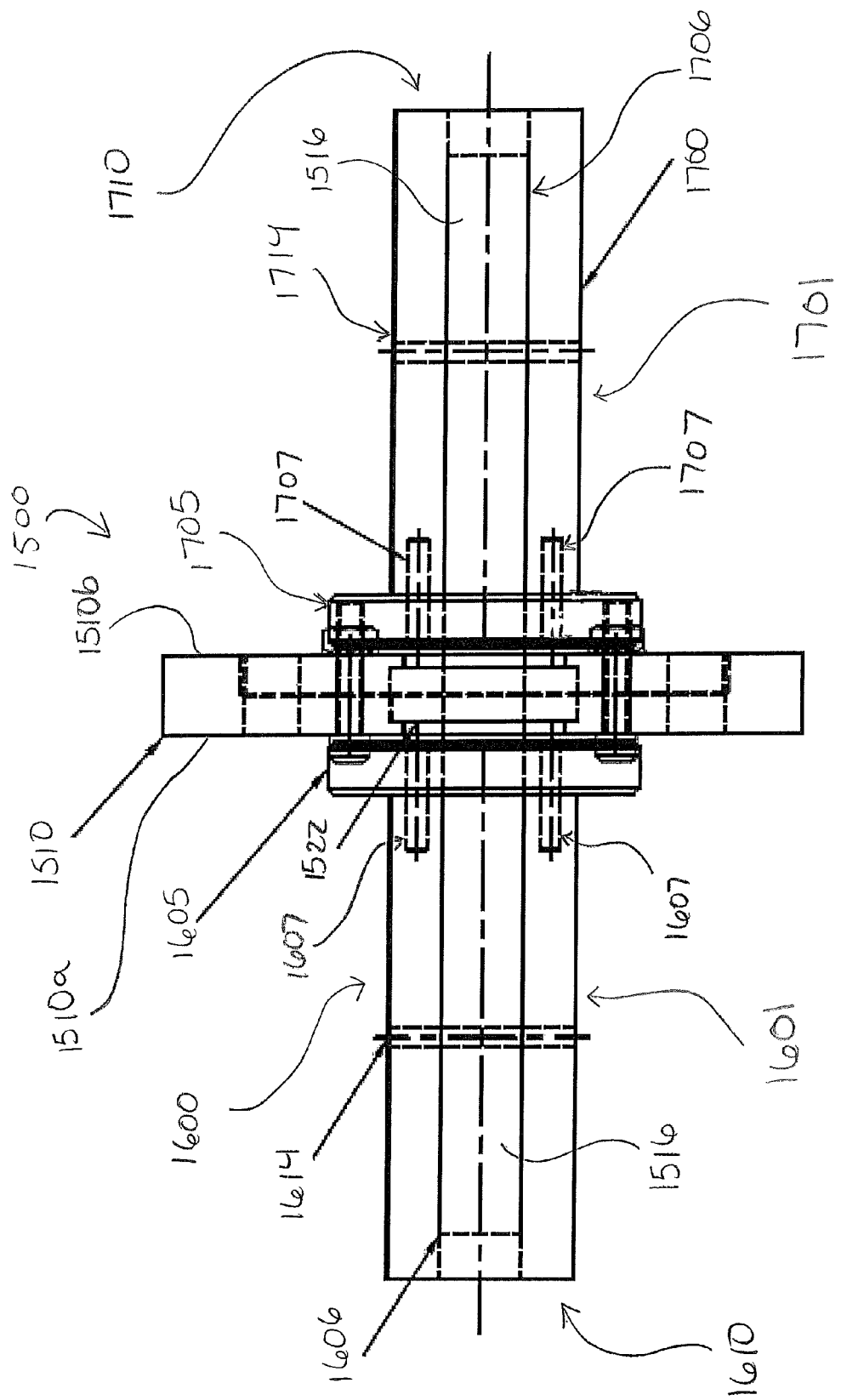
FIG. 20 is a top view of the drive tube coupling assembly of FIG. 19.

In the illustrated embodiment, coupling spacer (1105) and coupler (1101) are attached to each other by abutting the inner surface of coupler (1101) against the inner surface of coupling spacer (1105), aligning central opening (1106) in coupling spacer (1105) with the roll pin holes (1108, 1109) in each component, and inserting roll pins into roll pin holes (1108, 1109). Of course, other devices and methods for attaching coupling spacer (1105) and coupler (1101) may be used, provided those devices and methods provide adequate attachment between coupling spacer (1105) and coupler (1101). In some embodiments, similar to couplers (1601, 1701) shown in FIG. 20 and described in more detail below, coupler (1101) may further comprise an additional roll pin hole, such as roll pin holes (1614, 1714) in FIG. 20, that extends substantially transverse to inner tube (1104) configured to receive a roll pin to engage assembled drive tube coupling (1100) with a rotatable shaft of a bearing unit. For example, as shown in FIG. 20, roll pin holes (1614, 1714) may be used to engage couplers (1600, 1700) with rotatable shaft (1516) of bearing unit (1510).

In one embodiment, both coupling spacer (1105) and coupler (1101) of assembled drive tube coupling (1100) comprise a metal, such as aluminum, steel or bronze, or high temperature rubber. Of course, assembled drive tube coupling (1100) may comprise any suitable material configured to provide desired durability and strength depending on the particular application of coupling (1100), including but not limited to other materials configured to allow coupling (1100) to be used in a high temperature environment. Assembled drive tube coupling (1100) may comprise any material capable of withstanding the same temperatures as the drive tube being used in that section of conveyor. Assembled drive tube coupling (1100) may be fabricated as an assembly of multiple pieces, such as the embodiment shown in FIGS. 11-20 where coupling spacer (1105) and coupler (1101) comprise individual components attached to each other using roll pins (1109). In other embodiments, coupling spacer (1105) and coupler (1101) may be attached together using other suitable methods or devices as long as they provide adequate attachment between coupling spacer (1105) and coupler (1101), including but not limited to welding, adhesive, and fasteners. Embodiments of assembled drive tube coupling (1100) comprising a metal, such as aluminum, or some other high material configured to withstand high temperatures may be used in sections of a conveyor system where the components of the conveyor system are subjected to elevated temperatures. Other types of couplings, such as those comprising a molded elastomer, may not be able to be used in those types of environments with elevated temperatures.

Figure 14:
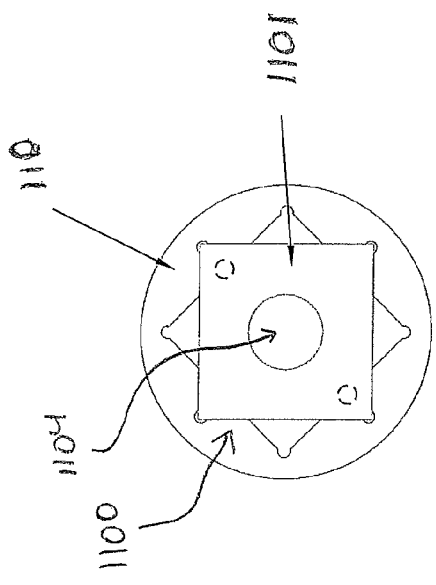
FIG. 14 is a front view of the assembled drive tube coupling of FIG. 11 within the drive tube of FIG. 8.
Figure 12:
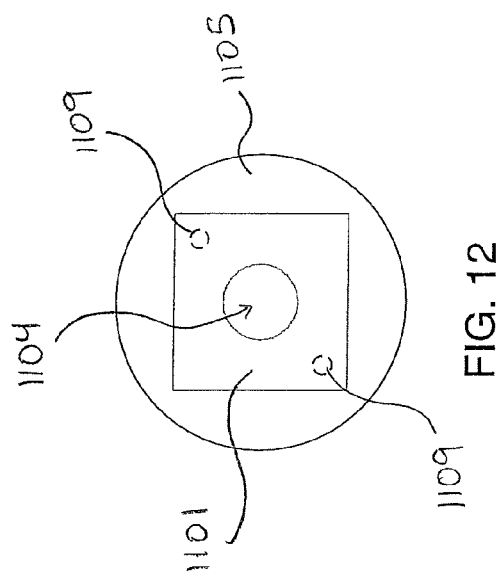
FIG. 12 is a front view of the assembled drive tube coupling of FIG. 11.

Coupler (1101) may be shaped and dimensioned in order to provide an adequate engagement between the assembled drive tube coupling (1100) and a corresponding drive tube, such as drive tube (110). In some embodiments, coupler (1101) may be configured to correspond with and provide a friction fit between assembled drive tube coupling (1100) and a corresponding drive tube, such as drive tube (110), FIG. 14 depicts assembled drive tube coupling (1100) inserted into drive tube (110). The relationship or fit between assembled drive tube coupling (1100) and drive tube (110) may help prevent assembled drive tube coupling (1100) from disengaging from drive tube (1110) during the assembly process, which is described below.

Figure 9:
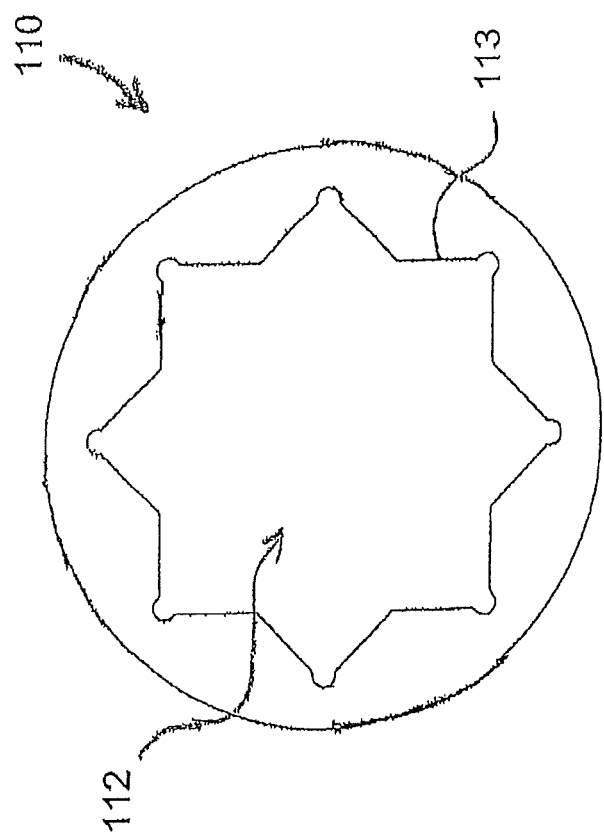
FIG. 9 is a front view of the integral drive tube of FIG. 8.

FIG. 14 depicts assembled drive tube coupling (1100) positioned within drive tube (110). Drive tube (110) is shown without drive tube coupling (100) in FIG. 9. As shown in FIG. 9 and described above, interior cavity (112) of drive tube (110) comprises a regular, sixteen-sided, generally star-shaped cross section. However, interior cavity (112) of drive tube (110) may comprise any suitably shaped cross section as would be apparent to one of ordinary skill in the art in view of the teachings herein. Cavity (112) may be configured to receive coupler (1101) of assembled drive tube coupling (1100). In this embodiment, each corner of cavity (112) defined by interior wall (113) is configured to receive and abut at least a portion of a respective edge of coupler (1101). As shown, the generally star-shaped cross section of cavity (112) is advantageously configured to provide increased flexibility during assembly by allowing coupler (1101) and drive tube (110) to be assembled together with the components at several different angles or orientations relative to each other. In particular, the cross section of cavity (112) is configured to allow coupler (1101) and drive tube (110) to be assembled together when the components are in a first orientation or a second orientation. The second orientation occurs when one of the components is rotated about 45 degrees relative to its position in the first orientation. In addition, cavity (112) may be configured to correspond to the profile of coupler (1101) such that the engagement between interior wall (113) and the respective edges of coupler (1101) result in an adequate friction fit between drive tube (110) and assembled drive tube coupling (1100). As a result of the engagement between drive tube (110) and assembled drive tube coupling (1100), the two components may be configured to rotate in unison with each other.

Similar to embodiments of drive tube coupling (100) described above, embodiments of assembled drive tube coupling (1100) may also be used to help assemble a series of drive tubes (110) during assembly of an overall conveyor system. For example, a first assembled drive tube coupling (1100) may be inserted into a first drive tube (110) and that complete assembly may then be attached to a preceding drive tube (110) that is already located in the conveyor system. As mentioned above, with regard to the illustrated embodiment, assembly may be facilitated by the generally star-shaped cross section of cavity (112), which may be advantageously configured to provide increased flexibility during assembly by allowing coupler (1101) and drive tube (110) to be assembled together with the components at several different angles or orientations relative to each other.

Figure 19:
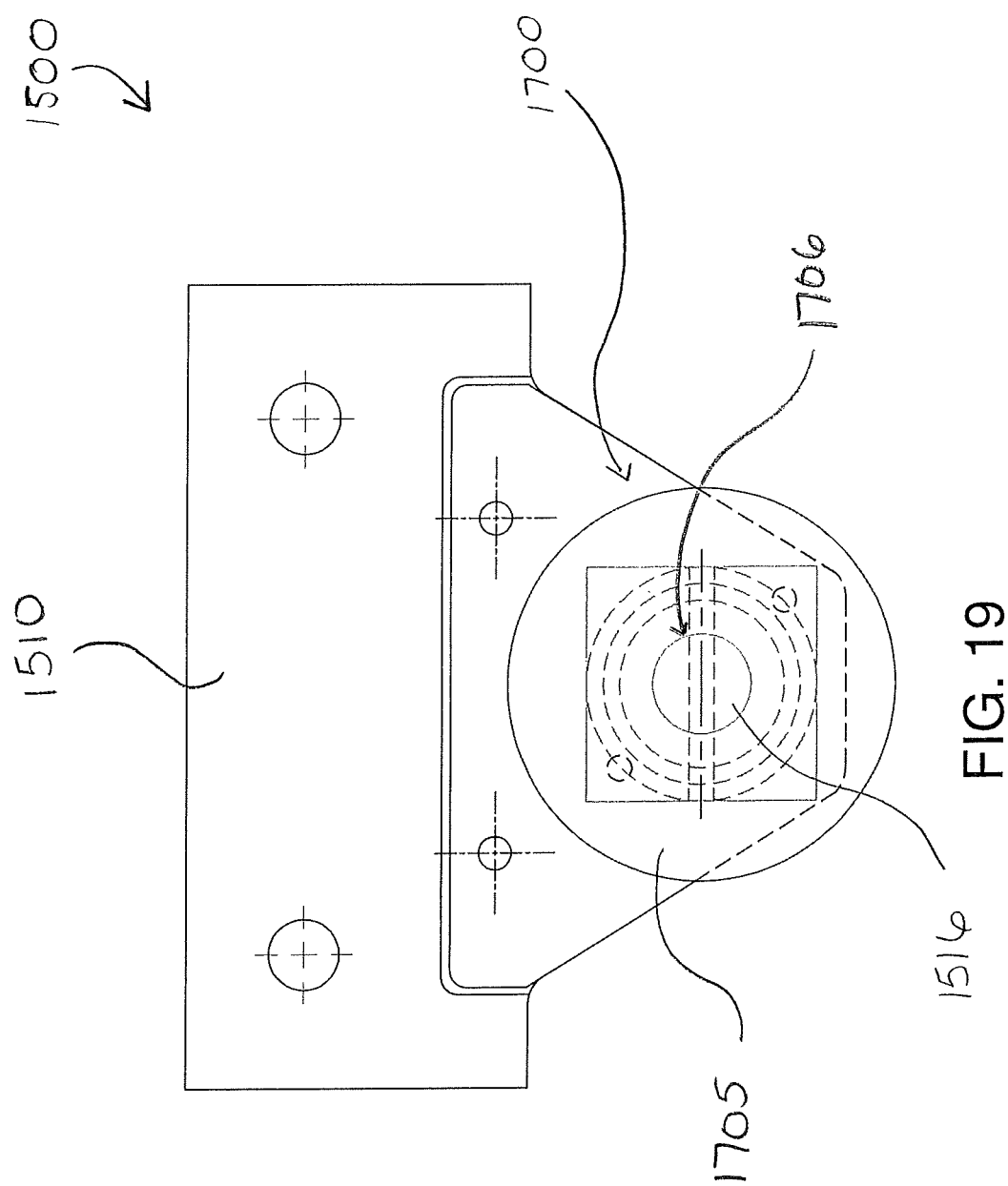
FIG. 19 is a front view of an exemplary drive tube coupling assembly that includes two of the assembled drive tube coupling of FIG. 11.

FIGS. 19 and 20 depict a drive tube coupling assembly (1500) comprising a pair of assembled drive tube couplings (1600, 1700) attached to a bearing unit (1510). As shown, assembled drive tube couplings (1600, 1700) are substantially identical to coupling (1100) described above. For example, each coupling (1600, 1700) comprises a coupling spacer (1605, 1705) similar to coupling spacer (1105) described above, attached to a coupler (1601, 1701), similar to coupler (1101) described above. In addition, in this embodiment, each coupling spacer (1605, 1705) is attached to a corresponding coupler (1601, 1701) via a pair of roll pins (1607, 1707).

As shown, bearing unit (1510) comprises a bearing housing (1520) that houses a bearing (1522) positioned between two bearing spacers and further includes a rotatable shaft (1516) inserted through a central opening in bearing unit (1510). In FIG. 20, bearing unit (1510) comprises a first face (1510a) and a second face (1510b). In the illustrated embodiment, assembled drive tube couplings (1600, 1700) are mounted to shaft (1516) on either side of bearing unit (1510) by inserting shaft (1516) through the central opening (1606, 1706) in each coupling (1600, 1700). In this embodiment, couplings (1600, 1700) are positioned along shaft (1516) such that the rear surface of each coupling spacer (1605, 1705) is substantially adjacent to a respective face (1510a, 1510b) of bearing unit (1510). Shaft (1516) may be sized such that it provides a friction fit when inserted into the central opening (1606, 1706) of each coupling (1600, 1700), but this is not necessarily required. Each assembled drive tube coupling (1600, 1700) may be engaged with shaft (1516) by inserting at least one roll pin through a roll pin hole (1614, 1714) in each coupling (1600, 1700) and a corresponding opening in shaft (1516). The roll pin may be configured to engage each coupling (1600, 1700) with shaft (1516) such that assembled drive tube couplings (1600, 1700) rotate unitarily with shaft (1516), and, consequently, rotate unitarily with each other. In some embodiments the roll pin may be omitted from at least one coupling and any other suitable method or device for engaging at least one coupling with the shaft may be used, including but not limited to use of an adhesive, surface treatment or dimensioning the components to provide an adequate friction fit between each coupling and the shaft.

Figure 21A:
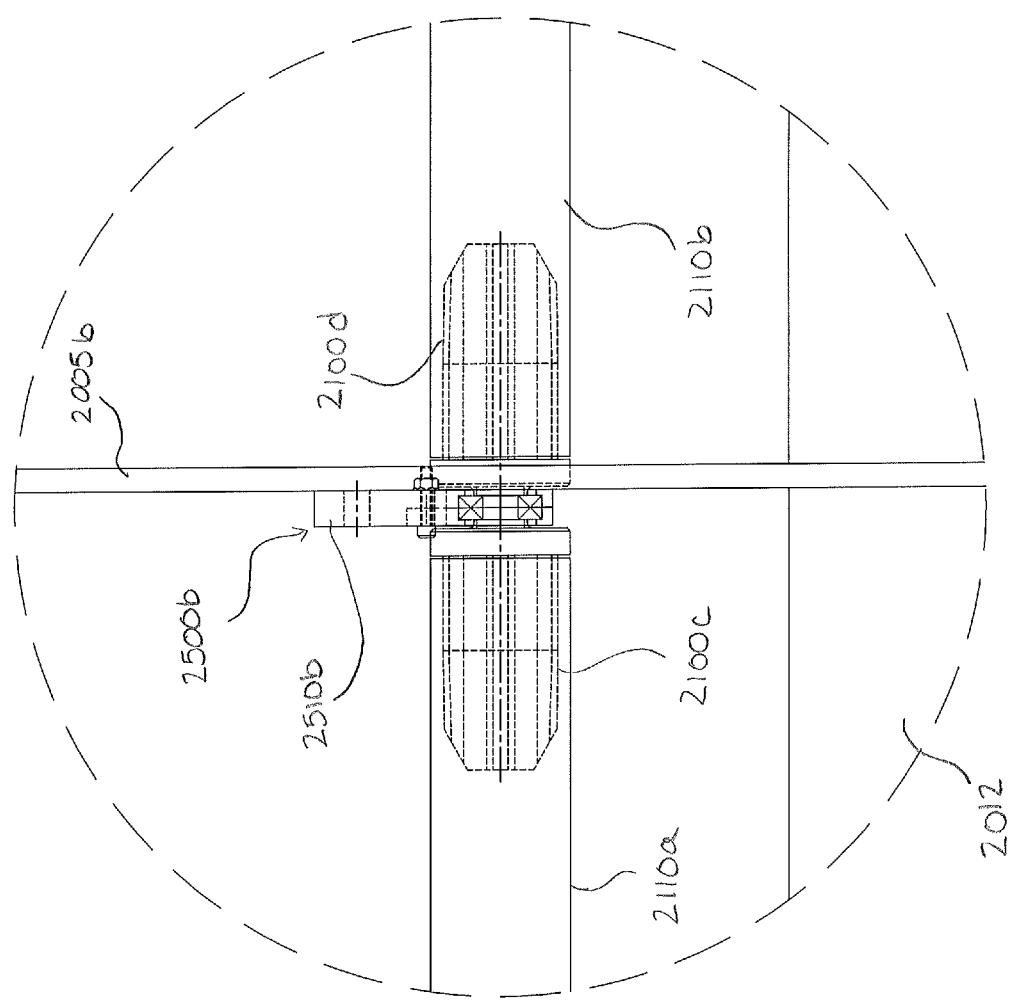
FIG. 21A is a detailed, side view depicting the portion of FIG. 21 indicated by the dashed circle labeled FIG. 21A.
Figure 21B:
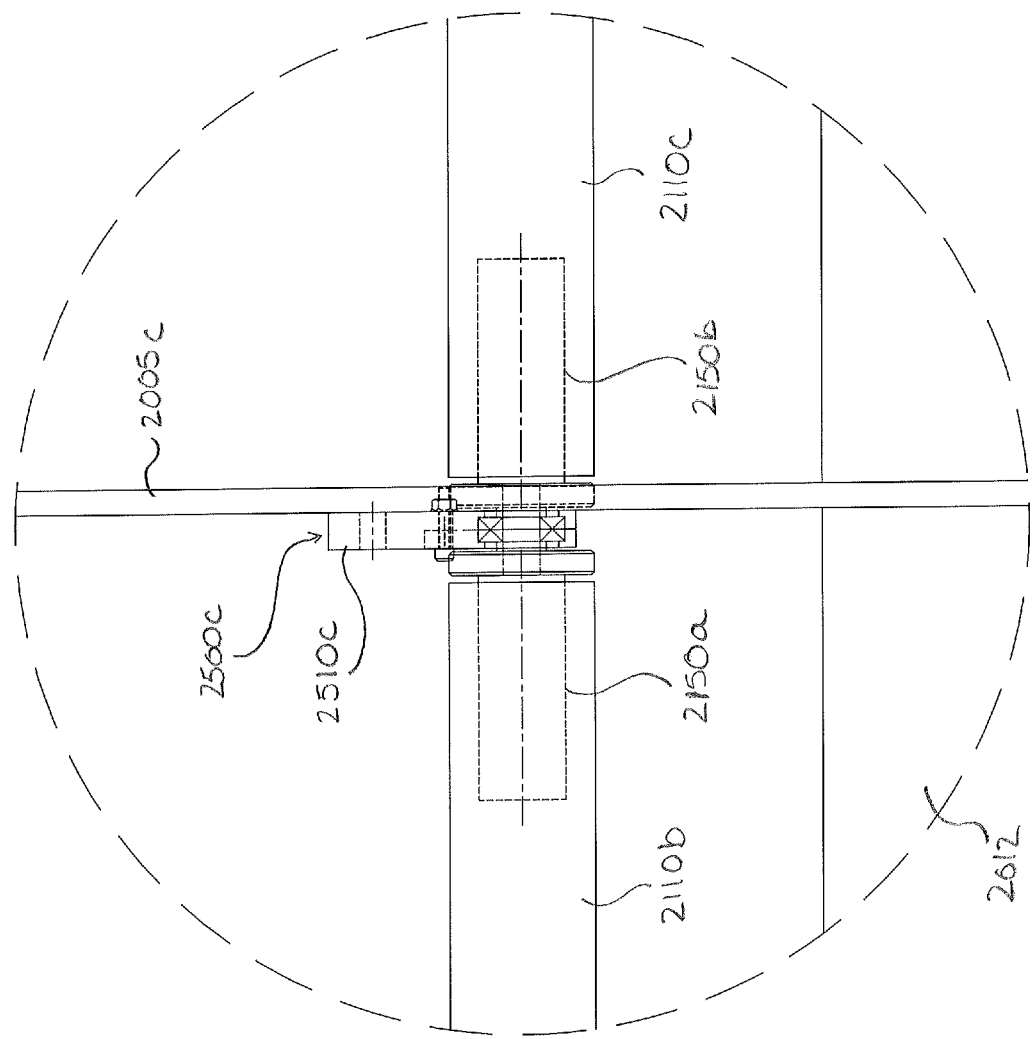
FIG. 21B is a detailed, side view depicting the portion of FIG. 21 indicated by the dashed circle labeled FIG. 21B.

Drive tube coupling assembly (1500) may be used to attach two drive tubes, together to form at least a portion of a conveyor system, such as in the embodiment shown in FIGS. 21, 21A and 21B. Coupling spacer (1605, 1705) of each coupling (1600, 1700) may be positioned substantially adjacent to a face (1510a, 1510b) of bearing unit (1510). In such an embodiment, each coupling (1600, 1700) may extend substantially perpendicularly from opposite faces (1510a, 1510b) of bearing unit (1510). A drive tube, such as drive tubes (2110b, 2110c) shown in FIG. 21, may then be inserted onto the free end (1610, 1710) of each coupling (1600, 1700) to form a part of a conveyor system. Coupling assembly (1500) may be assembled such that couplings (1600, 1700) can freely rotate relative to bearing unit (1510). As a result, coupling (1600) and a drive tube engaged therewith will rotate in unison with each other. Similarly, coupling (1700) and a drive tube engaged therewith will rotate in unison with each other. Couplings (1600, 1700) may be configured to rotate in unison together. In such an embodiment, couplings (1600, 1700) and each of the respective drive tubes engaged with couplings (1600, 1700) would be configured to rotate in unison together.

FIGS. 21, 21A, and 21B depict an embodiment of a portion of a conveyor system (2000) that includes four coupling assemblies (2500a, 2500b, 2500c, 2500d), four conveyor hangers (2005a, 2005b, 2005c, 2005d), and three drive tubes (2110a, 2110b, 2110c). In the illustrated embodiment, conveyor hangers (2005a, 2005b, 2005c, 2005d) comprise substantially u-shaped yokes or framing members configured to support corresponding coupling assemblies (2500a, 2500b, 2500e, 2500d) and drive tubes (2110a, 2110b, 2110c). As shown conveyor hangers (2005a, 2005b, 2005c, 2005d) are suspended from an overhead drive beam (2010) that is positioned above the path of the portion of conveyor system (2000). In this embodiment, conveyor hangers (2005a, 2005b, 2005c, 2005d) are positioned at regular intervals along overhead drive beam (2010). By way of example only, conveyor hangers (2005a, 2005b, 2005c, 2005d) may be positioned at intervals of about 20", about 40", or any other suitable interval that provides the desired relationship between the standard overall length of the drive tube(s) used in that section of conveyor and the coupling distance (D) between the couplings in that section. Conveyor hangers (2005a, 2005b, 2005c, 2005d) may be configured such that the opening in the u-shaped member is dimensioned to allow a trolley, such as trolley (2020) shown in FIG. 23, to pass through the conveyor hangers 2005a, 2005b, 2005c, 2005d) as the trolley travels along the portion of the conveyor system (2000).

Figure 22:
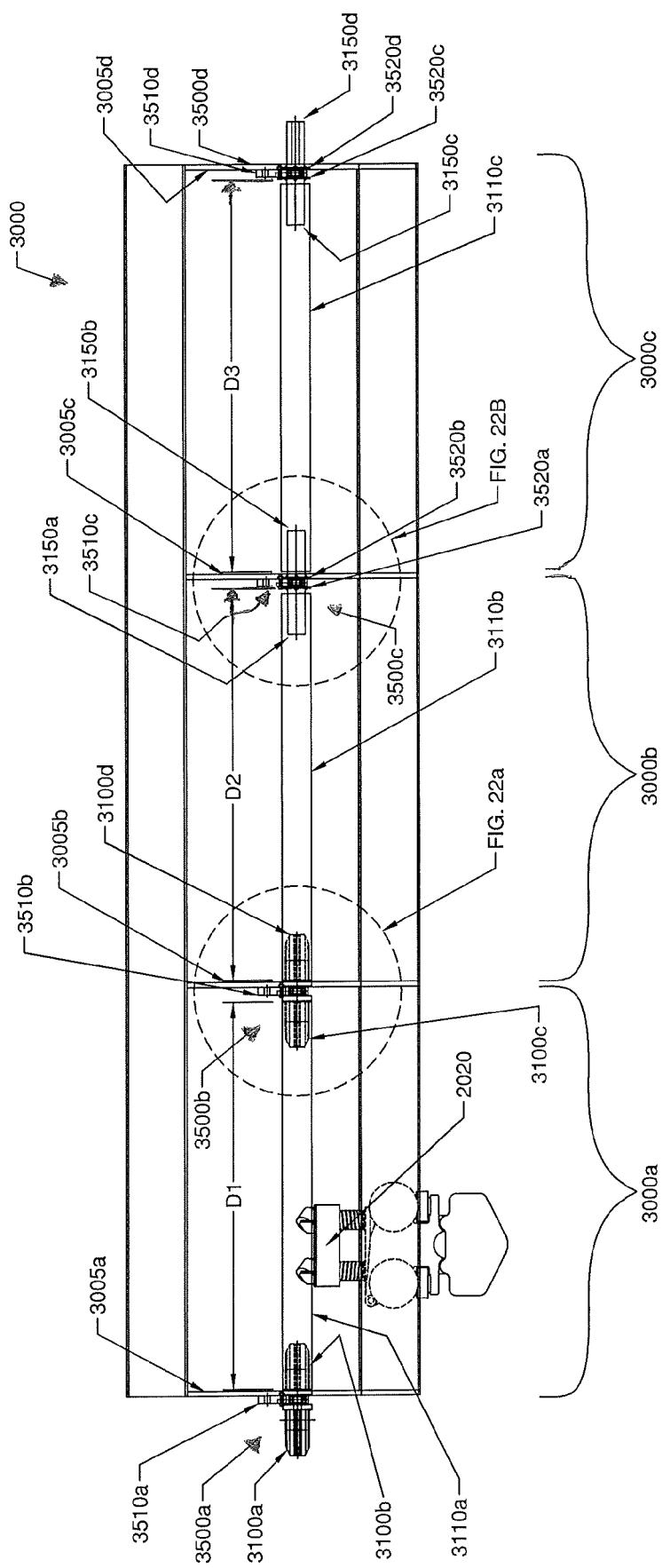
FIG. 22 is a side view of an exemplary conveyor system that includes a series of drive tubes engaged with a combination of the prior art assembled drive tube coupling of FIG. 1 and the integral drive tube coupling of FIG. 5.
Figure 23:
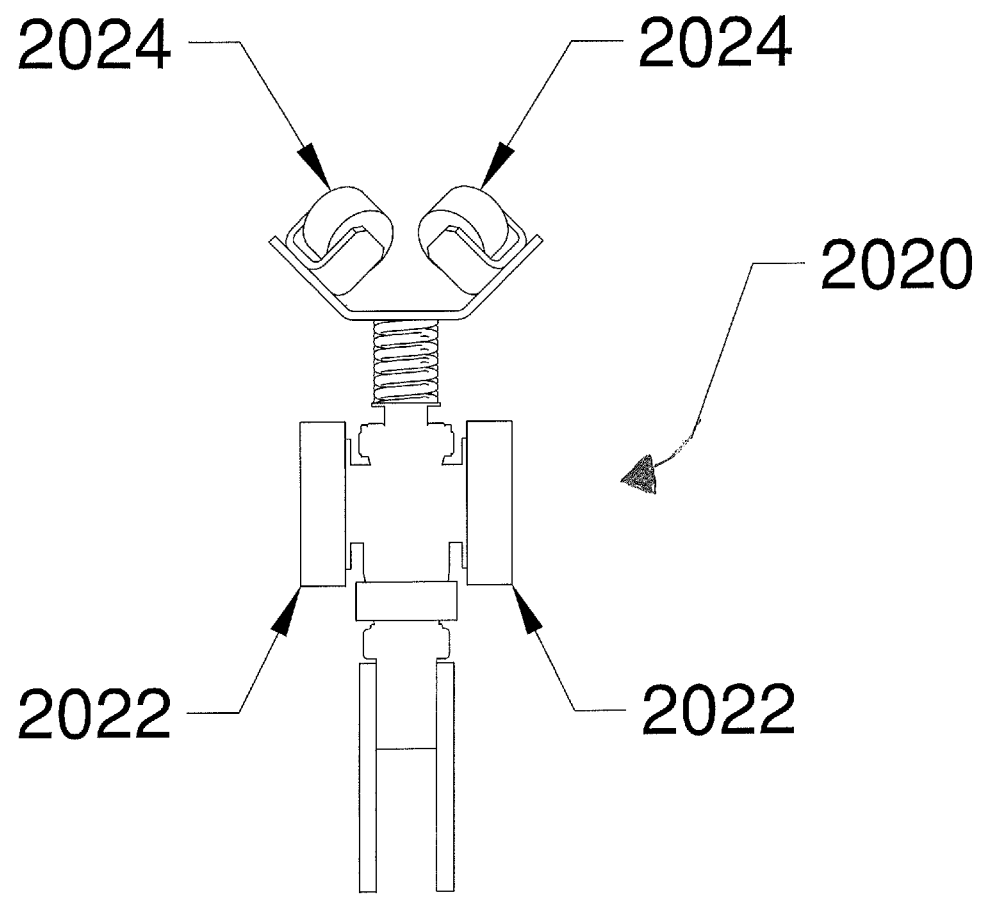
FIG. 23 is a front view of an exemplary trolley.

As shown in FIGS. 21, 22, and 23, trolley (2020) comprises, among other components, two pairs of rollers and two pairs of canted wheels. Trolley (2020) may include a pair of front rollers (2022) and a pair of rear rollers (2023), as well as a pair of front canted wheels (2024) and a pair of rear canted wheels (2025). During operation of the illustrated embodiment, trolley (2020) is propelled by a propulsive force generated by the engagement between the canted wheels (at least one of front pair (2024) and the rear pair (2025)) and at least one drive tube (2110a, 2110b, 2110c). As shown in FIGS. 21 and 22, while traveling along the conveyor section (2000) the rollers (both front pair (2022) and the rear pair (2023)) ride on top of load rail (2012). In other embodiments, the trolley and load rail may be configured to allow the rollers to ride within an interior cavity of the load rail, rather than on top of the load rail.

In the embodiment shown in FIG. 21, the portion of a conveyor system (2000) includes different types of drive tube couplings. Specifically, as shown, coupling assemblies (2500a, 2500b) include integral drive tube couplings (2100a, 2100b, 2100c, 2100d) that are substantially identical to integral drive tube coupling (100) described above, while coupling assemblies (2500c, 2500d) include assembled drive tube couplings (2150a, 2150b, 2150c, 2150d) that are substantially identical to assembled drive tube coupling (1100). Conveyor section (2000a) includes drive tube (2110a) which is positioned between and engaged with integral drive tube coupling (2100b) on one end and integral drive tube coupling (2100e) on the other end of drive tube (2110a). Conveyor section (2000b) includes drive tube (2110b) which is positioned between and engaged with integral drive tube coupling (2100d) on one end and assembled drive tube coupling (2150a) on the other end of drive tube (2110b). Finally, conveyor section (2000c) includes drive tube (2110c) which is positioned between and engaged with assembled drive tube coupling (2150b) on one end and assembled drive tube coupling (2150c) on the other end of drive tube (2110c). It will be appreciated that, although not shown in this embodiment, additional drive tubes may be engaged with integral drive tube coupling (2110a) and/or assembled drive tube coupling (2150d). In addition, corresponding conveyor components, including but not limited to additional drive beams, load rails, conveyor hangers, coupling assemblies, drive tubes, and drive tube couplings, may be used to provide additional portions of a continuous conveyor system.

In the illustrated embodiment, each of the coupling assemblies (2500a, 2500b, 2500c, 2500d) includes a bearing unit (2510a, 2510b, 2510c, 2510d) and a pair of drive tube couplings. As shown, each bearing unit (2510a, 2510b, 2510c, 2510d) is substantially identical to bearing unit (1510) described above. In this embodiment, each bearing unit (2510a, 2510b, 2510c, 2510d) is mounted on a respective conveyor hanger (2005a, 2005b, 2005c, 2005d). As discussed above, in the embodiment shown in FIG. 21, conveyor hangers (2005a, 2005b, 2005c, 2005d) are mounted at fixed intervals along overhead drive beam (2010). As a result, in this embodiment, bearing units (2510a, 2510b, 2510c, 2510d) are also positioned at fixed intervals. In other words, in the illustrated embodiment, the distance between two adjacent bearing units (2510a, 2510b, 2510c, 2510d), such as bearing unit (2510a) and bearing unit (2510b), is fixed and cannot be adjusted by varying the position of the bearing units themselves.

In addition, as shown in FIG. 21, drive tubes (2110a, 2110b, 2110c) are substantially identical to each other. Specifically, each of the drive tubes (2110a, 2110b, 2110c) may comprise substantially identical overall lengths. Furthermore, in some embodiments, each of the drive tubes (2110a, 2110b, 2110c) may comprise substantially identical interior cavities on both ends of each respective drive tube (2110a, 2110b, 2110c) that are configured to receive either an integral drive tube coupling (2100a, 2100b, 2100c, 2100d) or an assembled drive tube coupling (2150a, 2150b, 2150c, 2150d). By way of example only, each of the drive tubes (2110a, 2110b, 2110c) may comprise identical star-shaped interior cavities, such as interior cavity (112) described above, on both ends of each respective drive tube (2110a, 2110b, 2110c). In an alternate embodiment, a drive tube (2110a, 2110b, 2110c) may comprise an interior cavity on a first end that is configured to receive an integral drive tube coupling, while comprising a differently shaped interior cavity on the second end that is configured to receive an assembled drive tube coupling.

As used herein, the term "coupling distance" means the distance between the inner face of the base portion or coupling spacer of a first drive tube coupling and the inner face of the base portion or space a second drive tube coupling that is positioned opposite to the first drive tube coupling. As shown in FIG. 21, in conveyor section (2000a) integral drive tube coupling (2100b) is positioned opposite integral drive tube coupling (2100c), in conveyor section (2000b) integral drive tube coupling (2100d) is positioned opposite assembled drive tube coupling (2150a), and in conveyor section (2000c) assembled drive tube coupling (2150b) is positioned opposite assembled drive tube coupling (2150c). In the illustrated embodiment, the coupling distance (D) between each pair of drive tube couplings is substantially equal. Specifically, the coupling distance (D) between integral drive tube coupling (2100d) and assembled drive tube coupling (2150a) is substantially equal to the coupling distances (D) between the other two pairs of drive tube couplings, even though the middle pair of couplings (integral drive tube coupling (2100d) and assembled drive tube coupling (2150a)) comprises two different types of drive tube couplings, while the two outer pairs of couplings comprise two of the same type of drive tube couplings (the first pair comprises two integral drive tube couplings (2100b, 2100c) and the second pair comprises two assembled drive tube couplings (2150b, 2150c)). As discussed above, in the illustrated embodiment, bearing units (2510a, 2510b, 2510c, 2510d) are positioned at fixed intervals. Accordingly, the substantially equal coupling distances (D) result from the fact that the thickness of the base portion of integral drive tube couplings (2100a, 2100b, 2100c, 2100d) is substantially equal to the thickness of the coupling spacer of assembled drive tube couplings (2150a, 2150b, 2150c, 2150d).

In addition, in this embodiment, the overall length of each drive tube (2110a, 2110b, 2110c) is substantially equal to the coupling distance (D) between each pair of drive tube couplings. In other words, the relationship between the coupling distance (D) between each pair of drive tube couplings and the overall length of each drive tube (2110a, 2110b, 2110c) is such that, upon assembly, the gap, if any, between an end of a particular drive tube (2110a, 2110b, 2110c) and the inner face of the adjacent base portion or coupling spacer (depending on the type of drive tube coupling) is small enough to allow canted wheels (2024, 2025) of trolley (2020) to freely transition between adjacent drive tubes (2110a, 2110b, 2110c) without either causing damage to canted wheels (2024, 2025) or causing trolley (2020) to get hung up while transitioning between drive tubes (2110a, 2110b, 2110c). By way of example only, in some embodiments, the relationship between the coupling distance (D) between each pair of drive tube couplings and the overall length of each drive tube (2110a, 2110b, 2110c) may be such that, upon assembly, the gap between an end of a particular drive tube (2110a, 2110b, 2110c) and the inner face of the adjacent base portion or coupling spacer (depending on the type of drive tube coupling) is less than or equal to about 0.5". That gap is preferably smaller than the width of a canted wheel (2024, 2025) in order to provide the functionality described above, and in some embodiments that gap may be between about 0.25" and about 0.5".

In summary, the combination of these features shown in the illustrated embodiment results in a conveyor system where different types of drive tube couplings can be used interchangeably. The same drive tube may be positioned between a pair of integral drive tube couplings, a pair of assembled drive tube couplings, or a mixed pair comprising one integral drive tube coupling and one assembled drive tube coupling. This interchangeability may provide increased flexibility that may facilitate assembly and lower manufacturing costs by requiring fewer types of components.

Figure 22A:
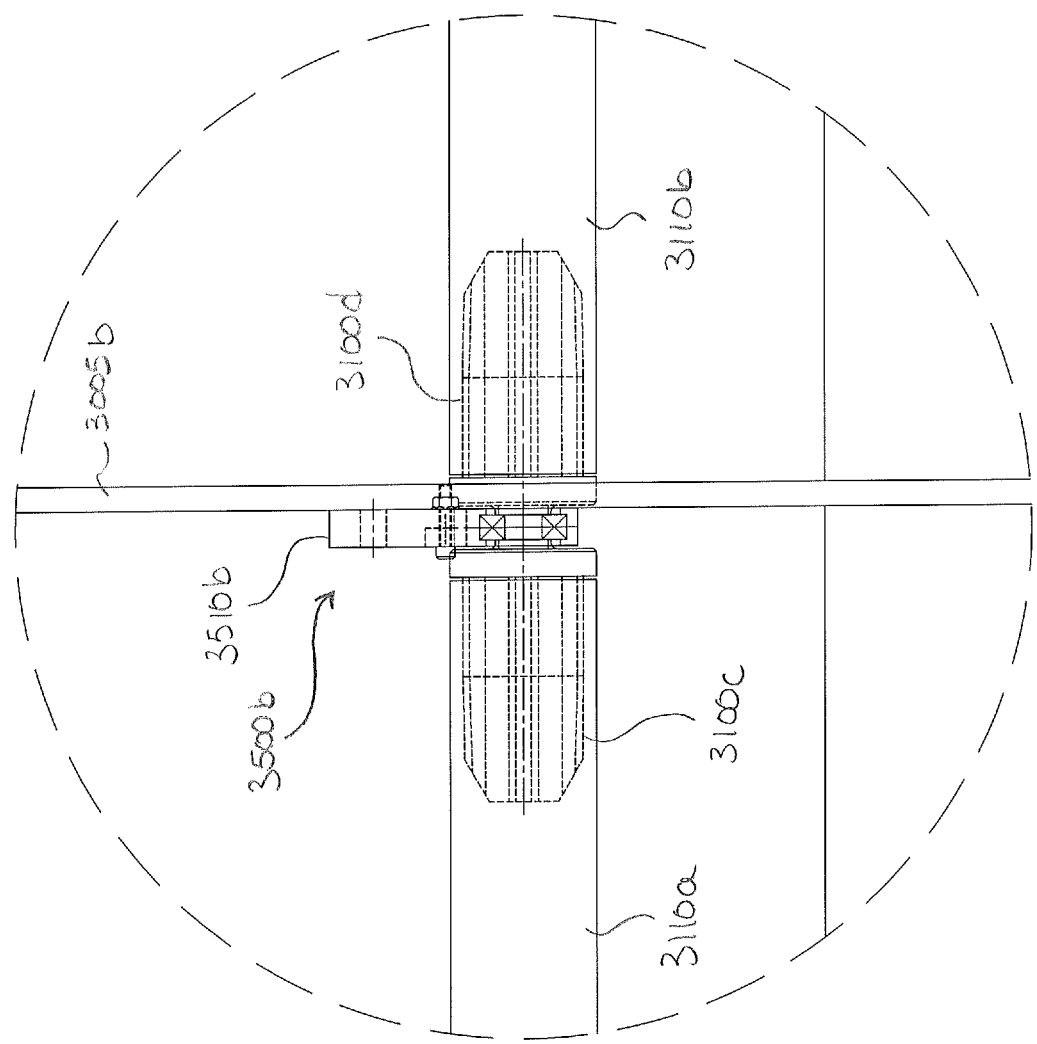
FIG. 22A is a detailed, side view depicting the portion of FIG. 22 indicated by the dashed circle labeled FIG. 22A.
Figure 22B:
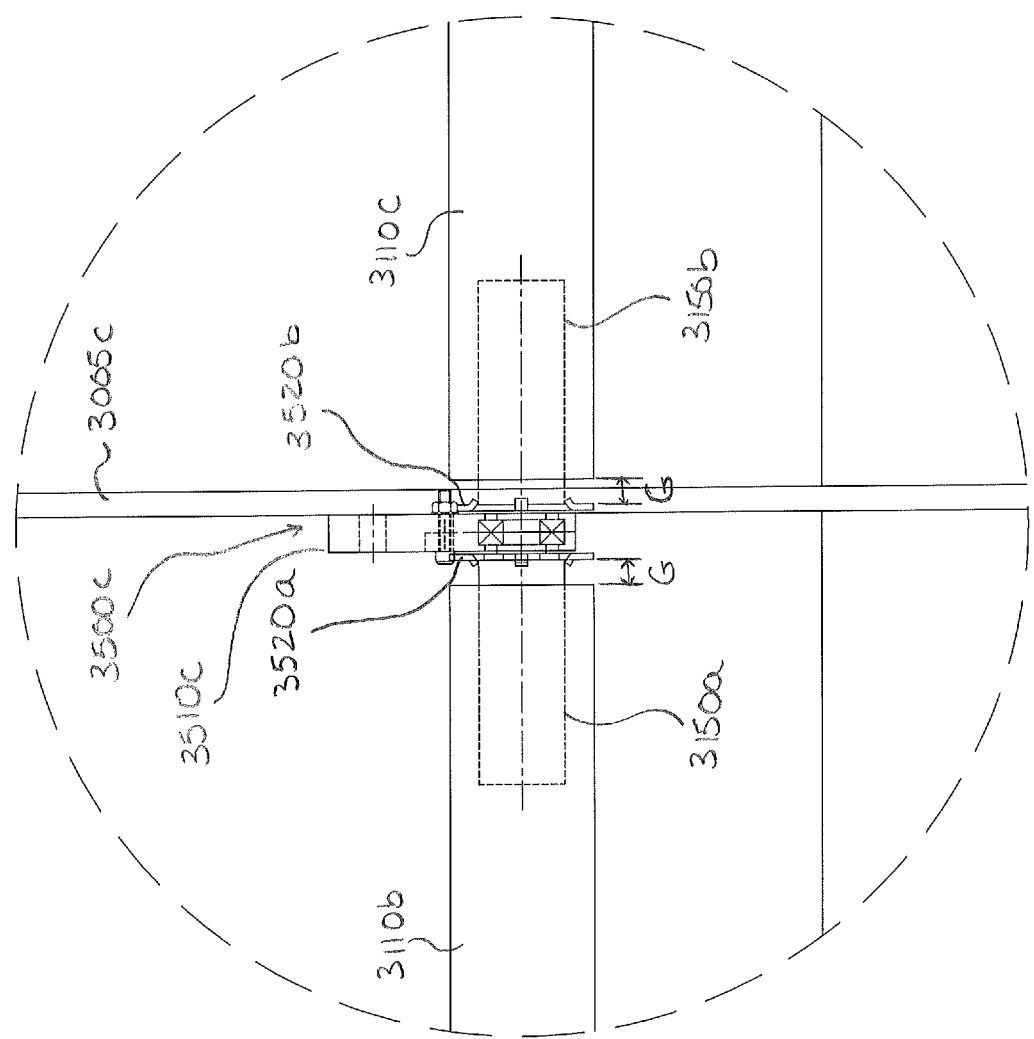
FIG. 22B is a detailed, side view depicting the portion of FIG. 22 indicated by the dashed circle labeled FIG. 22B.

In comparison, FIGS. 22, 22A, and 22B illustrate an embodiment of a conveyor system that requires drive tubes of three different overall lengths in order to operate correctly depending on the particular types of drive tube couplings engaged at either end of the respective drive tube. In this embodiment, the portion of a conveyor system (3000) includes four coupling assemblies (3500a, 3500b, 3500c, 3500d) respectively mounted on four conveyor hangers (3005a, 3005b, 3005c, 3005d) that are positioned at fixed intervals, and three drive tubes (3110a, 3110b, 3110c) extending between coupling assemblies (3500a, 3500b, 3500c, 3500d). In the illustrated embodiment, conveyor hangers (3005a, 3005b, 3005c, 3005d) are substantially identical to conveyor hangers (2005a, 2005b, 2005c, 2005d) described above and drive tubes (3110a, 3110b, 3110c) are substantially identical to drive tubes (2110a, 2110b, 2110c) described above. Each of the coupling assemblies (3500a, 3500b, 3500c, 3500d) shown in FIGS. 22, 22A, and 22B include a bearing unit (3510a, 3510b, 3510c, 3510d) and a pair of drive tube couplings. Bearing units (3510a, 3510b, 3510c, 3510d) are substantially identical to bearing units (2510a, 2510b, 2510c, 2510d) and bearing unit (1510) described above.

In this embodiment, the portion of a conveyor system (3000) includes different types of drive tube couplings. Specifically, as shown, coupling assemblies (3500a, 3500b) include integral drive tube couplings (3100a, 3100b, 3100c, 3100d) that are substantially identical to integral drive tube couplings (2100a, 2100b, 2100c, 2100d) and integral drive tube coupling (100) described above, while coupling assemblies (3500c, 3500d) include prior art drive tube couplings (3150a, 3150b, 3150c, 3150d) that are substantially identical to the prior art drive tube couplings (10, 12) shown in FIGS. 1-2 and described above. In addition, prior art drive tube couplings (3150a, 3150b, 3150c, 3150d) are connected to opposite sides of a respective bearing unit (3510a, 3510b, 3510c, 3510d) using a prior art washer (3520a, 3520b, 3520c, 3520d), which is substantially identical to prior art washer (20) shown in FIGS. 1-4 and described above.

As shown in FIG. 22, conveyor section (3000a) includes drive tube (3110a) which is positioned between and engaged with integral drive tube coupling (3100b) on one end and integral drive tube coupling (3100c) on the other end of drive tube (3110a). Conveyor section (3000b) includes drive tube (3110b) which is positioned between and engaged with integral drive tube coupling (3100d) on one end and prior art drive tube coupling (3150a) on the other end of drive tube (3110b). Finally, conveyor section (3000c) includes drive tube (3110c) which is positioned between and engaged with prior art drive tube coupling (3150b) on one end and prior art drive tube coupling (3150c) on the other end of drive tube (3110c). It will be appreciated that, although not shown in this embodiment, additional drive tubes may be engaged with integral drive tube coupling (3100a) and/or prior art drive tube coupling (3150d). In addition, corresponding conveyor components, including but not limited to additional drive beams, load rails, conveyor hangers, coupling assemblies, drive tubes, and drive tube couplings, may be used to provide additional portions of a continuous conveyor system.

In the embodiment shown in FIG. 22, the coupling distance of each of the conveyor sections (3000a, 3000b, 3000c) is different because different pairs of couplings are used in each section. Specifically, the coupling distance (D1) of conveyor section (3000a) is less than the coupling distance (D2) of conveyor section (3000b), and coupling distance (D2) of conveyor section (3000b) is less than the coupling distance (D3) of conveyor section (3000c). Drive tubes (3110a, 3110b, 3110c) shown in FIGS. 22, 22A, and 22B comprise substantially equal overall lengths in order to illustrate the gap that results when drive tubes of substantially equal overall lengths are used on conveyor sections that utilize combinations of the prior art drive tube couplings and integral drive tube couplings. In this embodiment, the overall length of each of the drive tubes (3110a, 3110b, 3110c) is substantially equal to coupling distance (D1), which results in drive tubes (3110b, 3110c) being too short to adequately span the coupling distance (D2, D3) in conveyor sections (3000b, 3000c). As shown, particularly in FIG. 22B, if drive tubes of substantially equal lengths are used in each conveyor section (3000a, 3000b, 3000c), then that will result in a gap (G) between the end of drive tube (3110b) and the inner face of the adjacent prior art washer (3520a) and a gap (G) between the end of drive tube (3110c) and the inner face of adjacent prior art washer (3520b). Gap (G) is too large to allow canted wheels (2024, 2025) of trolley (2020) to freely transition between adjacent drive tubes (3110a, 3110b, 3110c) without either causing damage to canted wheels (2024, 2025) or causing trolley (2020) to get hung up while transitioning between drive tubes (3110a, 3110b, 3110c). For example, depending on the material of the canted wheels (2024, 2025), if gap (G) is greater than about 75% of the width of a canted wheel (2024, 2025), then trolley (2020) may not be able to freely transition between adjacent drive tubes (3110a, 3110b, 3110c) and/or there may be damage to the canted wheels (2024, 2025). More specifically, if a harder material is used for canted wheels (2024, 2025), then the gap (G) may be larger relative to embodiments where a softer material is used for canted wheels (2024, 2025). In some embodiments, depending on various factors, in order to function properly, the gap (G) is less than or equal to about 0.5" and more particularly within the range from about 0.25" to about 0.5".

Accordingly, in the embodiment shown in FIG. 22, due to the different coupling distances (D1, D2, D3), each conveyor section (3000a, 3000b, 3000c) requires a drive tube of a different overall length so that, upon assembly, the gap, if any, between an end of a particular drive tube and the inner face of the adjacent base portion or coupling spacer or washer (depending on the type of drive tube coupling) is small enough to allow canted wheels (2024, 2025) of trolley (2020) to freely transition between adjacent drive tubes without either causing damage to canted wheels (2024, 2025) or causing trolley (2020) to get hung up while transitioning between drive tubes. As a result, the prior art drive tube couplings (3150a, 3150b, 3150c, 3150d) may not be used interchangeably with integral drive tube couplings (3100a, 3100b, 3100c, 3100d). In particular, a drive tube of a first length must be used between a pair of integral drive tube couplings, while a drive tube of a second length must be used between an integral drive tube coupling and a prior art drive tube coupling, and a drive tube of a third length must be used between a pair of prior art drive tube couplings. Consequently, use of non-interchangeable drive tube couplings may make assembly more difficult and result in increased manufacturing costs by requiring additional types of components.

Having shown and described various embodiments in the present disclosure, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A conveyor system comprising:
  a. a plurality of first drive tube couplings, wherein each first drive tube coupling of the plurality of first drive tube couplings comprises
    i. a base portion, wherein the base portion comprises a face and a thickness, and
    ii. an elongated portion, wherein the elongated portion extends from the face of the base portion at a first end, wherein the elongated portion further comprises at least one rib extending from the face of the base portion toward a distal end of the elongated portion, wherein the elongated portion comprises a cross-section;
  b. a plurality of second drive tube couplings, wherein each second drive tube coupling of the plurality of second drive tube couplings comprises
    i. a coupling spacer, wherein the coupling spacer comprises a face and a thickness, and
    ii. a coupler, wherein the coupler comprises an elongated member that abuts the face of the coupling spacer and extends substantially perpendicular thereto, wherein the coupler comprises a cross-section, wherein the cross-section of the elongated portion is different than the cross-section of the coupler;
  wherein the thickness of the base portion of each of the first drive tube couplings is substantially equal to the thickness of the coupling spacer of each of the second drive tube couplings.

2. The conveyor system of claim 1 further comprising a plurality of drive tubes, wherein at least one of the drive tubes is positioned between a first drive tube coupling and a second drive tube coupling such that the at least one drive tube engages the first drive tube coupling at a first end of the at least one drive tube and the second drive tube coupling at a second end of the at least one drive tube.

3. The conveyor system of claim 1, further comprising a plurality of drive tubes, wherein each of the plurality of drive tubes comprises a first interior cavity at a first end of the drive tube and a second interior cavity at a second end of the drive tube.

4. The conveyor system of claim 3, wherein the first interior cavity is configured to receive at least a portion of the elongated portion of a first drive tube coupling, wherein the second interior cavity is configured to receive at least a portion of the coupler of a second drive tube coupling.

5. The conveyor system of claim 4, wherein the first interior cavity is in communication with the second interior cavity such that they form a single continuous cavity along the entire length of each drive tube.

6. The conveyor system of claim 4, wherein the first interior cavity comprises a first profile, wherein the second interior cavity comprises a second profile, wherein the first profile is substantially identical to the second profile.

7. The conveyor system of claim 6, wherein the first profile comprises a substantially star-shaped profile, wherein the second profile comprises a substantially star-shaped profile.

8. The conveyor system of claim 4, wherein the first interior cavity of a first drive tube is configured to allow the at least a portion of the elongated portion of a first drive tube coupling to be received within the first interior cavity of the first drive tube while the first drive tube and the first drive tube coupling are positioned in a first orientation relative to each other, wherein the first interior cavity of the first drive tube is further configured to allow the at least a portion of the elongated portion of the first drive tube coupling to be received within the first interior cavity of the first drive tube while the first drive tube and the first drive tube coupling are positioned in a second orientation relative to each other, wherein the second orientation comprises one component selected from the group consisting essentially of the first drive tube and the first drive tube coupling being rotated about 45 degrees relative to the selected component's position in the first orientation.

9. The conveyor system of claim 8, wherein the second interior cavity of the first drive tube is configured to allow the at least a portion of the coupler of a second drive tube coupling to be received within the second interior cavity of the first drive tube while the first drive tube and the second drive tube coupling are positioned in a first orientation relative to each other, wherein the second interior cavity of the first drive tube is further configured to allow the at least a portion of the coupler of the second drive tube coupling to be received within the second interior cavity of the first drive tube while the first drive tube and the second drive tube coupling are positioned in a second orientation relative to each other, wherein the second orientation comprises one component relative selected from the group consisting essentially of the first drive tube and the second drive tube coupling being rotated about 45 degrees relative to the selected component's position in the first orientation.

10. A conveyor system comprising:
 a. a plurality of integral drive tube couplings, wherein each integral drive tube coupling of the plurality of integral drive tube couplings comprises
  iii. a base portion, wherein the base portion comprises a face, and
  iv. an elongated portion, wherein the elongated portion extends from the face of the base portion at a first end, wherein the elongated portion further comprises at least one rib extending from the face of the base portion toward a distal end of the elongated portion
 b. an assembled drive tube coupling, wherein the assembled drive tube coupling comprises
  v. a coupling spacer, wherein the coupling spacer comprises a face, and
  vi. a coupler, wherein the coupler comprises an elongated member that abuts the face of the coupling spacer and extends substantially perpendicular thereto;
 c. a first section of conveyor, wherein the first section of conveyor comprises a first drive tube positioned between a pair of integral drive tube couplings such that the first drive tube engages a first integral drive tube coupling of the pair of integral drive tube couplings at a first end of the first drive tube and engages a second integral drive tube coupling of the pair of integral drive tube couplings at a second end of the first drive tube, wherein the first drive tube comprises a first length, wherein the first drive tube is positioned between the pair of integral drive tube couplings such that there is a first gap between the first end of the first drive tube and the face of the base portion of the first integral drive tube coupling and a second gap between the second end of the first drive tube and the face of the base portion of the second integral drive tube coupling;
 d. a second section of conveyor, wherein the second section of conveyor comprises a second drive tube positioned between a pair of drive tube couplings, wherein the pair of drive tube couplings comprises the assembled drive tube coupling and a second drive tube coupling, wherein the second drive tube coupling comprises a face, wherein the second drive tube engages the assembled drive tube coupling at a first end of the second drive tube and engages the second drive tube coupling at a second end of the second drive tube, wherein the second drive tube comprises a second length, wherein the second drive tube is positioned between the assembled drive tube coupling and the second drive tube coupling such that there is a third gap between the first end of the second drive tube and the face of the coupling spacer of the assembled drive tube coupling and a fourth gap between the second end of the second drive tube and the face of the second drive tube coupling;
 e. a trolley, the trolley comprising at least one canted wheel, wherein the at least one canted wheel comprises width, wherein the at least one canted wheel contacts the first drive tube and the second drive tube as the trolley travels along the first section of conveyor and the second section of conveyor;
  wherein the first length of the first drive tube is substantially equal to the second length of the second drive tube, wherein the first integral drive tube coupling, the second integral drive tube coupling, the assembled drive tube coupling and the second drive tube coupling are dimensioned and positioned such that first gap, the second gap, the third gap, and the fourth gap each comprise a respective width that is less than or equal to the width of the at least one canted wheel.

11. The conveyor system of claim 10, wherein the first length of the first drive tube is substantially equal to the coupling distance between the pair of integral drive tube couplings.

12. The conveyor system of claim 11, wherein the second drive tube coupling comprises an integral drive tube coupling, wherein the second length of the second drive tube is substantially equal to the coupling distance between the assembled drive tube coupling and the second drive tube coupling.

13. The conveyor system of claim 11, wherein the second drive tube coupling comprises a second assembled drive tube coupling, wherein the second length of the second drive tube is substantially equal to the coupling distance between the assembled drive tube coupling and the second drive tube coupling.

14. The conveyor system of claim 10, wherein the base portion and elongated portion of each of the plurality of integral drive tube couplings comprise a first material, wherein the coupling spacer and coupler of the assembled drive tube coupling comprise a second material, wherein the first material is different than the second material.

15. The conveyor system of claim 14, wherein the first material comprises a high density urethane elastomer.

16. The conveyor system of claim 14, wherein the second material comprises aluminum.

17. The conveyor system of claim 10, wherein the assembled drive tube coupling is configured to be used in a high temperature environment.

18. A conveyor system that extends along a conveying path comprising a. a conveyor drive beam, wherein the conveyor drive beam extends above the conveying path;
b. a first support hanger, wherein the first support hanger depends from the conveyor drive beam;
c. a second support hanger, wherein the second support hanger depends from the conveyor drive beam and is spaced apart from the first support hanger at a fixed interval;
d. a third support hanger, wherein the third support hanger depends from the conveyor drive beam and is spaced apart from the second support hanger at the fixed interval such that the second support hanger is positioned between the first support hanger and the third support hanger;
e. a first bearing housing, wherein the first bearing housing is attached to the first support hanger and comprises a first face and a second face on opposite sides of the first bearing housing;
f. a second bearing housing, wherein the second bearing housing is attached to the second support hanger and comprises a first face and a second face on opposite sides of the second bearing housing, wherein the second bearing housing is arranged such that the first face of the second bearing housing opposes the second face of the first bearing housing;
g. a third bearing housing, wherein the third bearing housing is attached to the third support hanger and comprises a first face and a second face on opposite sides of the third bearing housing, wherein the third bearing housing is arranged such that the first face of the third bearing housing opposes the second face of the second bearing housing;
h. a first drive tube coupling comprising an integral drive tube coupling, wherein the first drive tube coupling is attached to the second face of the first bearing housing, wherein the first drive tube coupling comprises
  i. a base portion, wherein the base portion comprises a face, and
  ii. an elongated portion, wherein the elongated portion extends from the face of the base portion at a first end, wherein the elongated portion further comprises at least one rib extending from the face of the base portion toward a distal end of the elongated portion;
i. a second drive tube coupling comprising an integral drive tube coupling, wherein the second drive tube coupling is attached to the first face of the second bearing housing, wherein the second drive tube coupling comprises
  i. a base portion, wherein the base portion comprises a face, and
  ii. an elongated portion, wherein the elongated portion extends from the face of the base portion at a first end, wherein the elongated portion further comprises at least one rib extending from the face of the base portion toward a distal end of the elongated portion;
j. a third drive tube coupling comprising an integral drive tube coupling, wherein the third drive tube coupling is attached to the second face of the second bearing housing, wherein the third drive tube coupling comprises
  i. a base portion, wherein the base portion comprises a face, and
  ii. an elongated portion, wherein the elongated portion extends from the face of the base portion at a first end, wherein the elongated portion further comprises at least one rib extending from the face of the base portion toward a distal end of the elongated portion;
k. a fourth drive tube coupling comprising an assembled drive tube coupling, wherein the fourth drive tube coupling is attached to the first face of the third bearing housing, wherein the fourth drive tube coupling comprises
  i. a coupling spacer, wherein the coupling spacer comprises a face, and
  ii. a coupler, wherein the coupler comprises an elongated member that abuts the face of the coupling spacer and extends substantially perpendicular thereto;
    wherein the coupling distance between the first drive tube coupling and the second drive tube coupling is substantially equal to the coupling distance between the third drive tube coupling and the fourth drive tube coupling.

19. The conveyor system of claim 18, further comprising:
a. a fourth support hanger, wherein the fourth support hanger depends from the conveyor drive beam and is spaced apart from the third support hanger at the fixed interval such that the third support hanger is positioned between the second support hanger and the fourth support hanger;
b. a fourth bearing housing, wherein the fourth bearing housing is attached to the fourth support hanger and comprises a first face and a second face on opposite sides of the fourth bearing housing, wherein the fourth bearing housing is arranged such that the first face of the fourth bearing housing opposes the second face of the third bearing housing;
c. a fifth drive tube coupling, wherein the fifth drive tube coupling is attached to the second face of the third bearing housing, wherein the fifth drive tube coupling comprises
  i. a coupling spacer, wherein the coupling spacer comprises a face, and
  ii. a coupler, wherein the coupler comprises an elongated member that abuts the face of the coupling spacer and extends substantially perpendicular thereto; and
d. a sixth drive tube coupling, wherein the sixth drive tube coupling is attached to the first face of the fourth bearing housing, wherein the sixth drive tube coupling comprises
  i. a coupling spacer, wherein the coupling spacer comprises a face, and
  ii. a coupler, wherein the coupler comprises an elongated member that abuts the face of the coupling spacer and extends substantially perpendicular thereto;
    wherein the coupling distance between the first drive tube coupling and the second drive tube coupling is substantially equal to the coupling distance between the fifth drive tube coupling and the sixth drive tube coupling.

20. The conveyor system of claim 19, wherein at least one of the fourth drive tube coupling, the fifth drive tube coupling, and the sixth drive tube coupling is configured to be used in a high temperature environment.

* * * * *